(12) United States Patent
Lorah et al.

(10) Patent No.: US 6,765,049 B2
(45) Date of Patent: Jul. 20, 2004

(54) HIGH ACID AQUEOUS NANOCOMPOSITE DISPERSIONS

(75) Inventors: Dennis Paul Lorah, Landsdale, PA (US); Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 245 days.

(21) Appl. No.: 09/953,715

(22) Filed: Sep. 17, 2001

(65) Prior Publication Data

US 2002/0055580 A1 May 9, 2002

Related U.S. Application Data

(60) Provisional application No. 60/234,263, filed on Sep. 21, 2000.

(51) Int. Cl.$^7$ ................................................ C08K 3/34
(52) U.S. Cl. ........................ 524/445; 524/446; 524/447; 526/128; 526/126; 526/548; 526/346; 501/141; 501/145
(58) Field of Search ................................ 526/128, 548, 526/126, 346; 501/141, 145; 524/445, 446, 447

(56) References Cited

U.S. PATENT DOCUMENTS

| | | | |
|---|---|---|---|
| 2,531,396 A | 11/1950 | Carter et al. ................ 260/41.5 |
| 2,883,356 A | 4/1959 | Gluesenkamp ................ 260/37 |
| 4,351,754 A | 9/1982 | Dupre ......................... 524/445 |
| 4,421,902 A | 12/1983 | Chang et al. ................. 526/317 |
| 4,468,498 A | 8/1984 | Kowalski et al. ............ 525/301 |
| 4,739,007 A | 4/1988 | Okada et al. ................ 524/789 |
| 4,867,902 A | 9/1989 | Russell .................... 252/186.23 |
| 4,876,313 A | 10/1989 | Lorah ......................... 525/281 |
| 4,889,885 A | 12/1989 | Usuki et al. ................. 524/445 |
| 4,916,171 A | 4/1990 | Brown et al. ................ 523/161 |
| 5,032,546 A | 7/1991 | Giannelis et al. .............. 501/3 |
| 5,279,663 A | 1/1994 | Kaliski ........................ 106/486 |
| 5,376,709 A | 12/1994 | Lau et al. ...................... 524/48 |
| 5,545,695 A | 8/1996 | Blankenship ................ 525/301 |
| 5,780,376 A | 7/1998 | Gonzales et al. ............ 501/146 |
| 5,837,763 A | 11/1998 | Ferraro et al. ............... 524/449 |
| 5,916,967 A | 6/1999 | Jones et al. .................. 524/732 |
| 5,936,023 A | 8/1999 | Kato et al. ................... 524/445 |
| 5,962,553 A | 10/1999 | Ellsworth .................... 523/216 |
| 5,973,053 A | 10/1999 | Usuki et al. ................. 524/445 |
| 6,034,164 A | 3/2000 | Elspass et al. ............... 524/445 |
| 6,057,035 A | 5/2000 | Singh et al. .................. 428/407 |
| 6,063,857 A | 5/2000 | Greenblatt et al. .......... 524/561 |
| 6,252,004 B1 | 6/2001 | Blankenship et al. ....... 525/244 |

FOREIGN PATENT DOCUMENTS

| | | | |
|---|---|---|---|
| EP | 0846662 A2 | 6/1998 | ........... C01B/33/44 |
| GB | 2314335 | 12/1997 | ........... C01B/33/34 |
| JP | 94041346 | 2/1994 | ............ C08K/3/34 |
| WO | WO 95/14733 | 6/1995 | ............ C08K/3/34 |
| WO | WO 97/00910 | 1/1997 | ............. C08L/7/02 |
| WO | WO 00/29467 | 5/2000 | .............. C08J/3/20 |

OTHER PUBLICATIONS

Ugolstad, et al., "Swelling of Aqeos Dispersions of Polymer–Oligmer Particles. Preparation of Polymer Particles of Predetermined Particle Size Including Large Monodisperse Particles", pp. 83–93.

Huang, et al., Synthesis and Characterization of PMMA Nanocomposites by Suspension and Emulsion Polymerization, Department of Polymer Science, University of Akron, 2000, pp. A–D.

Lee, et al., "Characterization of Epoxy–Clay Hybrid Composite Prepared by Emulsion Polymerization", Journal of Applied Polymer Science, vol. 68, 1998, pp. 1997–2005.

Lee, et al., "Preparation and Characterization of PMMA–Clay Hybrid Composite by Emulsion Polymerization", Journal of Applied Polymer Science, vol. 61, 1996, pp. 1117–1122.

Bhattacharyya, et al., Aqueous Polymerization of Clay Surfaces v. Role of Lattice Substituted Iron in Montmorillonite in Polymerzation Methyl Methacrylate in the Presence of Thiourea, Journal of Polymer Science, vol. 28, pp. 2249–2254.

Bera, et al., "Water–Soluble Copolymers of Acrylamide with Diacetone–Acrylamide and N–t–Butylacrylamide on Aqeos Montmorillonite Surface, Synthesis and Characterization, European Polymer Journal, vol. 36, 2000, pp. 411–419."

Bera, et al., "Redox Polymerisation of Acrylamide on Aqueous Montmorillonite Surface: Kinetics and Mechanism of Enhanced Chain Growth", University of North Bengal, Darjeeling 734430, India, 1997.

Kirk–Othmer, "Surfactants", Concise Encyclopedia of Chemical Technology, 4$^{th}$ Ed., 1999, pp. 1949–1953.

Martin Grayson, Encyclopedia of Composite Materials and Components, 1983, pp. 324–340.

Kingery, et al., "Structure of Crystals", Introduction to Ceramics, 2$^{nd}$ Ed., 1960, pp. 77–80.

"Clay Mineralogy", www.pitt.edu/~harbert/courses/GEO0040/2C CLAYS.html.

(List continued on next page.)

Primary Examiner—Katarzyna Wyrozebski

(57) ABSTRACT

The present invention is directed to, in part, polymer clay nanocomposites having an acid containing monomer and clay. In one embodiment, there is provided a process for preparing an aqueous polymer clay nanocomposite dispersion, wherein the process comprises: providing an aqueous dispersion comprising at least one clay, optionally at least one ethylenically unsaturated monomer, and optionally at least one surfactant; providing a monomer mixture comprising at least 10% by weight of an acid containing monomer within the monomer mixture and optionally a surfactant; mixing the aqueous dispersion and the monomer mixture; and polymerizing the monomer to form the nanocomposite dispersion wherein the clay is at least partially exfoliated within the nanocomposite dispersion. The present invention also relates to the use of these compositions such as thickeners, dispersants, plastics additives, adhesives, coatings, flexographic inks, overprint varnishes, and dry cement powder modifiers.

46 Claims, No Drawings

OTHER PUBLICATIONS

"Soil Colloids: Their Nature and Practical Signifigance", www.agri.atu.edu/people/Hodgson/Soils/Chapter8.html.

Beall, et al., "Nanocomposites Produced Utilizing a Novel Ion–Dipole Clay Surface Modification", Chemistry and Technology of Polymer Additives, pp. 266–280.

Beall, et al., Nanocomposites Produced Utilizing a Novel Clay Surface Modification, pp. 1–14.

Ron Dagani, "Putting the "Nano" into Composites", C&EN Washington, Jun. 7, 1999, pp. 25–37.

Noh, et al., "Synthesis and Characterization of PS–clay Nanocomposite by Emulsion Polymerization", Polymer Bulletin, 42, (1999), pp. 619–626.

Choi, et al., "Characterization of Emulsion Intercalated Polymer–Na Montmorillonite Nanocomposite", Department of Polymer Science and Engineering, Inha University, Inchon, South Korea, pp. 247–248.

Noh, et al., "Comparison of Characteristics of SAN–MMT Nanocomposites Prepared by Emulsion and Solution of Polymerization", Department of Polymer Science and Engineering, Inha University, Inchon, South Korea, pp. 2811–2819.

Noh, et al. "Intercalation of Styrene–Acrylonitrile Copolymer in Layered Silicate by Emulsion Polymerization", Department of Polymer Science and Engineering, Inha University, Inchon, South Korea, pp. 179–188.

Kim, et al., "Electrorheological Characteristics of Emulsion Polymerized San–Clay Nanocomposite Suspensions", Department of Polymer Science and Engineering, Inha University, Inchon, South Korea, pp. 512–513.

"Ion–Exchange Reaction", Encyclopedia Britannica, www.britannica.com/bcom/eb/article/printable/2/0,5722,118752,00.html.

J.C. Padget, "Polymers for Water Based Coatings—A Systematic Overview", Proceedings of the $19^{th}$ International Conference in Organic Coatings Science and Technology, 1993, pp. 387–416.

A.S. Teot, "Resins, Water Soluble", vol. 20, pp. 207–230.

G. D. Shay, "Alkali–Swellable and Alkali–Soluble Thickener Technology", Polymers in Aqueous Media, American Chemical Society, 1989, pp. 458–495.

C. Batchelor, "Alkali Soluble Resins for Flexographic Inks", Polymers, Paint and Colour Journal, May 31, 1978, pp. 472–476.

HIGH ACID AQUEOUS NANOCOMPOSITE DISPERSIONS

CROSS REFERENCE TO RELATED PATENT APPLICATIONS

This non-provisional application claims benefit of provisional Application 60/234,263 filed Sep. 21, 2000.

FIELD OF THE INVENTION

The present invention relates generally to polymer clay aqueous nanocomposite dispersions and methods for making and using the same. More particularly, the present invention relates to methods of making polymer clay nanocomposite dispersions derived from an acid containing monomer and clay that are used, for example, as alkali swellable and alkali soluble thickeners. This invention also relates to the use of these nanocomposite compositions such as, for example, dispersants, binders, coatings, print pastes, over print varnishes, dry powder cement modifiers, personal care products, household or industrial cleaners, or flexographic inks.

BACKGROUND OF THE INVENTION

Alkali swellable and alkali soluble thickening copolymers ("AST") are generally carboxyl functional copolymers that are produced by the free-radical polymerization of ethylenically unsaturated monomers. The reference, Gregory D. Shaw, "Alkali-Swellable and Alkali-Soluble Thickener Technology", *Polymers in Aqueous Media*, American Chemical Society (1989), pp. 457–494 provides a general overview of AST copolymers. These copolymers can be substantially water insoluble at low pH but may be completely soluble or swell substantially in water upon partial or complete neutralization. The term neutralization, as used herein, relates to raising the pH of the system via the addition of an appropriate base.

AST copolymers may be classified structurally as either conventional, i.e., lacking associative function, or associative. The structural distinctions between the two classes results in differences in rheological properties wherein the associative AST copolymers may provide higher degrees of thickening or a unique rheology to aqueous solutions. While either of these ASTs may be copolymerized from a variety of ethylenically unsaturated monomers, at least one of these monomers should have a carboxyl functional group, such as a carboxylic acid containing monomer, and be present in a sufficient amount to render the polymer water swellable or water soluble on partial or complete neutralization with an appropriate base. Conventional AST copolymers may generally contain one or more hydrophobic comonomers in addition to the hydrophilic carboxyl-containing acid monomer. Associative AST copolymers, by contrast, may generally contain a carboxylic monomer, such as a carboxylic acid containing monomer, a hydrophobic monomer, and an additional monomer that is associative. The hydrophobic monomer in the associative AST may be omitted if the associative monomer is able to impart the proper hydrophilic-hydrophobic balance for the desired pH-dependent solubility.

AST copolymers may further be classified by the polymerization techniques in which they are made. Non-aqueous, or non-emulsion polymerization techniques, may be used to produce conventional ASTs referred to as alkali-swellable or alkali-soluble non-emulsions ("ASNE") or associative ASTs referred to as hydrophobically modified, alkali-swellable or alkali-soluble non-emulsions ("HASNE"). Aqueous based, emulsion polymerization techniques may be used to produce conventional ASTs referred to as alkali-swellable or alkali-soluble emulsions ("ASE") or associative ASTs referred to as hydrophobically modified, alkali-swellable or alkali-soluble emulsions ("HASE").

AST copolymers prepared by emulsion polymerization techniques, such as ASE or HASE copolymers, are typically prepared with about 10–80% by weight of carboxylic acid monomer and water-soluble persulfate initiators. Depending upon the application, it may be desirable that the AST copolymers exhibit high molecular weight, high viscosity, significant particle swelling, and are thus used at low percentage solids upon neutralization. Typically, high acid polymers are compounds or additives within formulations. Further, it may also be desirable that the AST copolymers impart improved physical properties such as strength, toughness, block, print and dirt pick-up resistance, enhanced barrier properties, and enhanced temperature and flame retardence. Certain properties, such as strength and toughness are advantageous, for example, in overprint varnish applications but disadvantageous in other applications such as thickening agents.

AST copolymers are oftentimes used in applications such as thickeners to enhance the viscosity within an aqueous system by, for example, reducing the flow of the system. The increased viscosity imparted by the thickener may range from slight thickening in moderately flowable systems to generally immobile systems such as gels. Many of the thickeners used in the art are synthesized or derived from natural products such as natural gums which may make them expensive to manufacture and impart variability from lot to lot. To remedy these problems, inorganic thickeners, such as clay-base minerals, were adopted. However, these inorganic thickeners suffer numerous difficulties such as the inability to provide high strength, self-supporting gels or the inability to withstand the stresses of handling and shipping. In this regard, aqueous gels based upon inorganic thickeners may crack or crumble as they begin to lose water.

U.S. Pat. No. 4,351,754 issued to Dupre ("Dupre") discloses a HASE thickening agent for aqueous compositions comprising an admixture of a water swellable clay mineral and an acrylic or methacrylic acid emulsion copolymer that is characterized by the inclusion of a hydrophobe containing monomer. In Dupre, the clay material is blended or admixed with the copolymer either before or after neutralization. The amount of clay mineral and acrylic or methacrylic acid copolymer in the mixture varies depending upon the degree of thickening desired and other properties such as strength, elasticity, and plasticity of the gelatinous form of aqueous systems. Dupre, however, does not disclose the addition of the clay mineral prior to the polymerization of the acrylic or methacrylic acid emulsion copolymer. Further, Dupre does not disclose, inter alia, AST copolymers with phase separated morphologies produced by sequential emulsions polymerization techniques such as core shell or polymer latex seed copolymers.

Clays may not always provide a desirable improvement in the physical properties, particularly mechanical properties, of the AST copolymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and the polymers is related to the fact that clays, by nature, are generally hydrophilic whereas polymers, such as the polymers used in the aforementioned applications, are generally hydrophobic.

Nanocomposites are polymer clay compositions in which at least one of its constituents has one or more dimensions, such as length, width or thickness, in the nanometer size range. The term "nanocomposite", as used herein, denotes the state of matter wherein polymer molecules exist among at least partially exfoliated clay layers. Recently, nanocomposites that contain layered clay materials such as montmorillonite having silicate layers of a thickness of 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition while maintaining the physical properties of the nanocomposite. In the present invention, high acid containing polymers help exfoliate the clay thereby enhancing the affinity between the clay and the polymer. This is evidenced, in certain embodiments, by a reduction in haziness or higher viscosity in the resultant polymer clay nanocomposite.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of modifying agents, such as surfactants or silanes, to prepare a clay dispersion prior to its incorporation into a polymer. For example, surfactants may typically comprise a molecule having a hydrophilic function (which has an affinity to polar media such as water or clay) and a hydrophobic function (which has an affinity to organic molecules such as oil or polymer). The use of surfactants generally permits the dispersion of a clay within a polymer. As used herein, the term "hydrophobically modified clays" denotes clays that may have its surface chemistry modified through the use of an agent such as a surfactant, silane, or other modifier. As used herein, the term "unmodified clays" denotes clays that have not been hydrophobically modified by a modifying agent, or are used in their natural state.

Typical modifying agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", Bull. Chem. Soc. Jpn., 70, 2593–2619 (1997).

There are significant processing difficulties encountered when preparing nanocomposites in aqueous dispersions using hydrophobically modified clays. In this connection, U.S. Pat. No. 5,883,173 issued to Elspass et al. (hereafter "Elspass") describes a process for preparing single stage rubbery nanocomposite materials by polymerizing or blending latex polymers in the presence of a dispersion of a layered (clay) material. In the aqueous latex processes provided, Elspass discloses that the layered material is dispersed in water with a surfactant such as an onium salt for separating the layers, and then the monomers are polymerized for approximately 46 hours to allow the polymers to intercalate between the layers. The step of adding a surfactant to exfoliate the layers is time-consuming (e.g., Elspass discloses mixing a clay, surfactant, and monomer slurry for 20 hours, prior to polymerizing for another 26 hours). Moreover, the exfoliated clay dispersions tend to be highly viscous thereby causing processing problems.

Another disadvantage of using hydrophobically modified clays is that the surfactants, particularly cationic surfactants, used to modify the clay may destabilize polymer latex emulsions. Many of the surfactants, such as onium salts, that are used to disperse clays are also emulsifying agents. In some cases, extreme difficulties may be encountered in the preparation of a stable polymer latex in the presence of such onium salt modified clays. To keep such emulsions stable in the presence of such onium salts, a large quantity of emulsifier is typically required. Larger quantities of emulsifier can degrade properties of the polymer in its final use (e.g., poorer water resistance). Furthermore, large quantities of emulsifier may deleteriously affect the formation of polymer latex particles. Non-uniform polymer latex particle formation may lead to variations in emulsion droplet size resulting in non-uniform polymer particle sizes. Large quantities of emulsifier may also lead to the formation of "secondary particles" which may further broaden the particle size distribution. As well, there are often problems associated with broad particle size distributions such as shear instability of the emulsion, variability in polymer molecular weight (leading to variations in polymer process and properties), and degradation of properties when dried to a powder (e.g., dust resulting from the presence of small polymer particles).

The foregoing problems aggravate the formation of latex polymer particles using emulsion polymerization processes. More particularly, the foregoing problems aggravate the formation of multi-stage latex polymer particles. Examples of multi-stage polymer processes, which are susceptible to these problems, include the preparation of "core-shell" polymer particles and using the gradual monomer addition, or "grad-add" processes.

Multi-stage polymer processes are oftentimes used to produce AST containing copolymers. For example, U.S. Pat. No. 4,916,171 issued to Brown et al. ("Brown") discloses core-shell polymers and compositions thereof that exhibit good rheology and ease of application. The core-shell polymers disclosed in Brown have an alkali-insoluble, emulsion polymer core and an alkali-soluble, emulsion polymer shell attached or associated to the cores so that upon dissolving the shell with alkali, a portion of the shell remains attached or associated with the core. Similarly, U.S. Pat. No. 4,876,313 issued to Lorah ("Lorah") discloses core-shell polymers having an alkali-insoluble, emulsion polymer core and an alkali-soluble, emulsion polymer shell. The core and shell components are chemically grafted together by emulsion polymerizing either the core or the shell in the presence of at least one polyfunctional compound having two or more sites of unsaturation, two or more abstractable atoms, or a combination of one or more sites of unsaturation and one or more abstractable atoms. Neither Brown nor Lorah discloses, inter alia, the addition of a clay to the core and/or shell compositions. It is believed that the addition of clay prior to or during the polymerization process may provide further improvements in the properties of these core-shell polymers such as rheology, toughness, heat seal resistance (i.e. reduced blocking at elevated temperatures), and flame retardence.

SUMMARY OF THE INVENTION

The present invention does not require the use of modifying agents, such as surfactants, to create the exfoliated state. Thus, the present invention is directed to solving the aforementioned problems related to the preparation of alkali swellable or alkali soluble, aqueous nanocomposite dispersions using unmodified clays. It is thus surprising and unexpected to prepare high acid containing polymer clay nanocomposites incorporating unmodified clays in aqueous based systems such as emulsion polymerization. The term "high acid", as used herein, relates to polymer clay nanocomposites that comprise 10 weight percent or greater of polymerized units of an acid containing monomer. In preferred embodiments, the methods of the present invention provide polymer clay nanocomposites that are alkali soluble or alkali swellable upon neutralization and may exhibit control of particle size, stability, and high polymerization rates. The methods of the present invention allow for control of reaction conditions such as temperature that is advantageous for industrial or commercial production. The methods of the present invention also allow for control of the viscosity of the resultant aqueous nanocomposite dispersions which is particularly important in certain applications, such as but not limited to thickeners, binders, dispersants, flexographic inks, overprint varnishes, and dry powder cement modifiers.

Nanocomposites produced in accordance with the methods of the present invention may preferably be provided in a form suitable for direct use in a variety of compositions, such as, for example, coatings, thickeners, dispersants, plastics additives, adhesives, coatings, print pastes, personal care products, household or industrial cleaners, or flexographic inks. The polymer clay nanocomposites of the present invention show significant property improvements at clay levels of 0.1–20%, such as increased tensile strength with little or no adverse effect on ancillary properties such as barrier properties, flexibility, film forming ability, and the like. By contrast, conventional composites typically need 15–30% of a filler in order to see significant reinforcement. At this level of filler, ancillary properties like barrier properties, flexibility, film forming ability, and the like are degraded.

The present invention is directed, in part, to high acid containing, nanocomposite compositions in aqueous systems and processes for preparing same. Specifically, in one embodiment of the present invention, there is provided a process for preparing an aqueous nanocomposite dispersion providing an aqueous dispersion comprising at least one clay, optionally at least one ethylenically unsaturated monomer, and optionally at least one surfactant; providing a monomer mixture comprising at least 10 weight percent of an acid containing monomer within the monomer mixture and optionally at least one surfactant; mixing the aqueous dispersion and the monomer mixture; and polymerizing at least a portion of the monomer to form the nanocomposite dispersion wherein the clay is at least partially exfoliated and/or intercalated within the nanocomposite dispersion. In certain embodiments, the monomer is polymerized after the mixing step. It is understood, however, that these steps may be performed in a variety of different orders. For example, in one embodiment, the second providing step and the mixing step may be performed either prior to or after the polymerizing step.

In another embodiment of the present invention, there is provided a process for preparing an aqueous nanocomposite dispersion providing an aqueous dispersion comprising at least one clay, optionally at least one ethylenically unsaturated monomer, and optionally at least one surfactant; providing a monomer mixture comprising at least 10 weight percent of an acid containing monomer within the monomer mixture, at least one clay, and optionally at least one surfactant; mixing the aqueous dispersion and the monomer mixture; and polymerizing at least a portion of the monomer to form the nanocomposite dispersion wherein the clay is at least partially exfoliated and/or intercalated within the nanocomposite dispersion.

In a further embodiment of the present invention, there is provided a process for preparing an aqueous nanocomposite dispersion providing an aqueous dispersion comprising at least one clay, at least one ethylenically unsaturated monomer, at least 10 weight percent of an acid containing monomer within the monomer mixture, and optionally at least one surfactant; providing a monomer mixture comprising at least one ethylenically unsaturated monomer and optionally at least one surfactant; mixing the aqueous dispersion and the monomer mixture; and polymerizing at least a portion of the monomer to form the nanocomposite dispersion wherein the clay is at least partially exfoliated and/or intercalated within the nanocomposite dispersion.

In yet another embodiment of the present invention, there is provided a polymer clay nanocomposite dispersion prepared by providing an aqueous emulsion comprising a polymer clay nanocomposite seed wherein the polymer clay nanocomposite seed is prepared according to the processes of the present invention and comprises 0.1 to 200% by weight of an unmodified clay based on dry weight of total dry polymer weight in the nanocomposite dispersion; providing a monomer emulsion comprising at least one ethylenically unsaturated monomer, optionally at least one polyunsaturated monomer, and optionally a surfactant; adding the monomer emulsion to the aqueous emulsion; and polymerizing the monomer to form the aqueous polymer clay nanocomposite dispersion. In certain preferred embodiments, the polymer clay nanocomposite seed is hydrophobically modified by a modifying agent. In further embodiments, the aqueous or monomer emulsion may further comprise 0.1 to 200% based on dry weight of total dry polymer weight in said aqueous polymer clay nanocomposite dispersion of at least one unmodified clay.

In still another embodiment of the present invention, there are provided thickening agents, dispersants, binders, flexographic inks, over print varnishes, and dry powder cement modifiers, prepared according to the processes of the present invention.

In a further embodiment of the present invention, there is provided an aqueous polymer clay nanocomposite dispersion. The aqueous polymer clay nanocomposite dispersion is comprised of a polymer latex having at least 10% polymerized units of at least one acid containing monomer and a clay dispersion comprising at least one clay that is at least partially exfoliated by the polymerization of the latex, wherein the viscosity of the nanocomposite dispersion after neutralization is higher than a nanocomposite dispersion in which the polymer latex and the clay dispersion are admixed.

In yet another embodiment of the present invention, there is provided a polymer clay nanocomposite composition comprising a polymer core and a polymer shell that is associated with the polymer core and wherein the ratio of the polymer core to the polymer shell is 90:10 to 10:90. The polymer core is polymerized from an aqueous dispersion comprising at least one clay, an ethylenically unsaturated monomer, and optionally at least one surfactant. The polymer shell is polymerized from a monomer mixture comprising at least 10 weight percent of an acid containing monomer within the monomer mixture, optionally at least one clay, and optionally at least one surfactant.

In still a further embodiment of the present invention, there is provided a polymer clay nanocomposite composition comprising a polymer core and a polymer shell that is associated with the polymer core and wherein the ratio of the polymer core to the polymer shell is 90:10 to 10:90. The polymer core is polymerized from a monomer mixture comprising at least 10 weight percent of an acid containing monomer within the monomer mixture, optionally at least one clay, and optionally at least one surfactant. The polymer shell is polymerized from an aqueous dispersion comprising at least one clay, an ethylenically unsaturated monomer, and optionally at least one surfactant.

In still another embodiment of the present invention, there is provided a polymer clay nanocomposite composition comprising a polymer core and a polymer shell that is associated with the polymer core and wherein the ratio of the polymer core to the polymer shell is 90:10 to 10:90. The polymer core is polymerized from an aqueous dispersion comprising at least one clay, at least 10 weight percent of an acid containing monomer within the monomer mixture, and optionally at least one surfactant. The polymer shell is polymerized from a monomer mixture comprising optionally at least one clay, an ethylenically unsaturated monomer, and optionally at least one surfactant.

In a further embodiment of the present invention, there is provided a polymer clay nanocomposite composition comprising a polymer core and a polymer shell that is associated with the polymer core and wherein the ratio of the polymer core to the polymer shell is 90:10 to 10:90. The polymer core is polymerized from a monomer mixture comprising an ethylenically unsaturated monomer, optionally at least one clay, and optionally at least one surfactant. The polymer shell is polymerized from an aqueous dispersion comprising at least 10 weight percent of an acid containing monomer within the monomer mixture, at least one clay, and optionally at least one surfactant.

In still a further embodiment of the present invention, there is provided a method for preparing a plurality of hollow, polymer clay nanocomposite particles, wherein the method comprises: providing an aqueous emulsion of a multi-stage emulsion polymer. The multi-stage emulsion polymer comprises: a core stage polymer comprising an aqueous polymer clay nanocomposite composition comprised of polymerized units of at least 10 weight percent of an acid containing monomer, an at least one unmodified clay, optionally at least one ethylenically unsaturated monomer, and at least one modifying agent wherein the clay is hydrophobically modified prior to the formation of the shell stage polymer and a shell stage polymer comprising polymerized units of at least one ethylenically unsaturated monomer. The core stage polymer is swollen with at least one swelling agent and at least one ethylenically unsaturated monomer such that at least a portion of the core stage polymer contacts at least a portion of the shell stage polymer. The monomer is then polymerized to form the polymer clay nanocomposite particles which becomes hollow upon drying.

In yet a further embodiment of the present invention, there is provided a process for preparing an aqueous nanocomposite dispersion comprising admixing an aqueous emulsion polymer with an aqueous dispersion comprising at least one clay and the acid is neutralized. The aqueous emulsion polymer comprises polymerized units of at least one ethylenically unsaturated monomer wherein at least 10 weight percent or greater of the monomer is an acid containing monomer and optionally at least one polyunsaturated monomer.

These and other aspects of the invention will become apparent from the following detailed description.

DETAILED DESCRIPTION OF PREFERRED EMBODIMENTS

I. General

The present invention is directed to processes for preparing nanocomposite compositions, particles, colloids, and dispersions using unmodified clays for emulsion polymerization systems. It has now been found that various emulsion polymerization procedures, such as multi-stage and grad-add polymerizations, are useful for preparing nanocomposite polymeric materials wherein a modifying agent, such as a cationic surfactant, may not be required to exfoliate the clay layers. The present invention overcomes the processing difficulties, such as particle size, dispersion instability, or other attributes, that are typically encountered using hydrophobically modified clays of the prior art. The present invention also provides uses for these aqueous based nanocomposite compositions, such as, for example, thickening agents, dispersants, binders, coatings, print pastes, personal care products, household or industrial cleaners, or flexographic inks.

In certain embodiments of the present invention, the nanocomposite is prepared via an emulsion-based polymerization technique. For example, in connection with the preparation of an aqueous nanocomposite dispersion, two or more separate aqueous mixtures may be prepared initially which is followed by a multi-stage emulsion polymerization of at least a portion of the monomer within the mixtures. While the present application discusses multi-stage polymerization primarily in terms of two stages, it is understood that more than two stages of polymerization of the monomer is further envisioned. The term "stage", "multi-stage", and "core shell" as used herein, is intended to encompass its broadest possible meaning, such as, for example, the meaning conveyed in U.S. Pat. Nos. 3,793,402, 3,971,835, 5,534,594, and 5,599,854, which disclose various means for achieving "staged" and "multi-staged" polymers. In certain embodiments, the first aqueous mixture may comprise an aqueous clay dispersion, optionally, at least one monomer or a monomer mixture, and optionally at least one surfactant whereas the second aqueous mixture may comprise a monomer mixture and optionally at least one surfactant. The first aqueous mixture and/or the second aqueous mixture comprises at least 10 weight percent of an acid containing monomer based upon the dry weight of polymer within the polymer clay nanocomposite. In other embodiments, the first aqueous mixture may be an aqueous emulsion comprising a polymer clay nanocomposite seed prepared by the processes of the present invention and the second aqueous mixture may be an aqueous dispersion comprising optionally at least one partially exfoliated clay and optionally at least one monomer or monomer mixture. The term "aqueous nanocomposite dispersion" relates to a clay and polymer nanocomposite that further comprises an aqueous, or water phase. In certain embodiments, the monomer mixture in the first and/or the second aqueous mixtures may be emulsified. In one embodiment of the present invention, the percent weight of clay to the total amount of monomer within the aqueous nanocomposite dispersion can be in the range of from 0.05% to 20%, preferably from 0.1% to 15%, and more preferably from 0.1% to 10%, and even more preferably from 0.5% to 5%.

The aqueous nanocomposite dispersion contains polymerized units derived from at least one type of ethylenically unsaturated monomer. The term "units derived from", as used herein, refers to polymer molecules that are synthesized according to known polymerization techniques wherein a polymer contains "units derived from" its constituent monomers. Preferably, the ethylenically unsaturated monomer is selected such that the polymerized units within the aqueous nanocomposite dispersion are water insoluble, i.e., have low or no water solubility. By "water-insoluble" it is meant having a water solubility of no greater than 150 millimoles/liter at 25° C. to 50° C.

The preparation of the monomer mixture typically involves the vigorous mixing of at least one ethylenically unsaturated monomer with water and an emulsifier. In other embodiments of the present invention the monomer may be added "neat", i.e., added without water. The amounts of monomer, water, and emulsifier in the monomer mixture may vary depending upon, for example, the particular monomer and/or emulsifier selected, the intended end-use, and the like. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g. monomers, emulsifier, and water). The amount of emulsifier in the monomer mixture, if added, is preferably in the range of from 0.01 to 10, preferably from 0.05 to 2, and even more preferably from 0.1 to 1 weight percent. If the emulsifier amount is too low then the monomer emulsion droplet size may be too large or cause an unstable emulsion. If the emulsifier amount is too high then excess emulsifier may interfere with the polymerization process.

The monomers which may be polymerized include any of the ethylenically unsaturated monomers commonly known in the art, such as those listed in The Polymer Handbook, $3^{rd}$ Edition, Brandrup and Immergut, Eds., Wiley Interscience, Chapter 2, (1989). Suitable ethylenically unsaturated monomers include, for example, the $C_1$–$C_{18}$ alkyl (meth)acrylate monomers (e.g., methyl-, ethyl-, propyl-, n-butyl-, sec-butyl-, tert-butyl-, pentyl-, isobornyl-, hexyl-, heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versitate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$–$C_{18}$ alkyl (meth)acrylamides, and the like); dienes (e.g., butadiene and isoprene); hydroxyethyl (meth)acrylate, hydroxypropyl(meth)acrylate, ethylene, and the like. The term "(meth)acrylate", as used herein, refers to both esters of methacrylate and acrylate.

For the purposes of preparing nanocomposite compositions having desirable resistance to weathering, it is preferred to use monomers selected from the class of alkyl (meth) acrylates. For the purposes of providing low cost and commercially available aqueous nanocomposite dispersions, it is preferable that the ethylenically unsaturated monomer be selected from the group consisting of $C_1$–$C_{18}$ alkyl methacrylate, $C_1$–$C_{18}$ alkyl acrylate, acrylic acid, methacrylic acid, butadiene, vinylaromatic monomers, and the like. For the purposes of using the aqueous nanocomposite dispersions for preparing coatings and adhesives, it is preferable to use $C_1$–$C_{18}$ alkyl (meth)acrylate monomers; acrylic acid; methacrylic acid; itaconic acid; vinyl acetate; vinyl versatate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous nanocomposite dispersions in a variety of applications due to their relatively low cost and commercial availability.

As mentioned previously, the aqueous mixture may comprise at least 10 weight percent of an acid containing monomer based upon the dry weight of monomer. Preferably, the acid containing monomer is a carboxylic acid containing monomer. The term "acid containing monomer", as used herein, refers to any ethylenically unsaturated monomer that contains one or more acid functional groups or functional groups that are capable of forming an acid, such as an anhydride, for example, methacrylic anhydride, maleic anhydride, itaconic anhydride, and citraconic anhydride. Examples of acid containing monomers include, for example, carboxylic acid bearing ethylenically unsaturated monomers such as acrylic acid, methacrylic acid, itaconic acid, maleic acid, crotonic acid, citraconic acid, and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. Depending upon the application of the nanocomposite dispersion, the amount of acid containing monomer added may range from 10 to 95%, preferably from 15 to 60%, and more preferably from 20 to 50% by weight of dry weight of polymer within the polymer clay nanocomposite.

In certain embodiments of the present invention such as preparing an ASE polymer clay nanocomposite, one or more polyunsaturated monomers may be added to the aqueous mixture. As used herein, the polyunsaturated monomers may also be referred to as crosslinkers or graftlinkers. The term "crosslinker", as used herein, refers to multi-functional monomers capable of forming two or more covalent bonds between polymer molecules of the same type. The term "graftlinker", as used herein, refers to multi-functional monomers capable of forming two or more covalent bonds between polymer molecules of one type with polymer molecules of another type. The monomers which may be polymerized include any of the polyunsaturated monomers commonly known in the art, such as those listed in *The Polymer Handbook*, $4^{rd}$ Edition, Brandrup and Immergut, Eds., Wiley Interscience, Chapter 2, (1998). Suitable polyunsaturated unsaturated monomers include, for example, the divinylbenzene, divinylpyridine, divinyltoluene, diallyl phthalate, ethylene glycol dia(meth)crylate, butylene glycol di(meth)acrylate, divinylxylene, divinylethylbenzene, divinylsulfone, divinylketone, divinylsulfide, allyl methacrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof. Still further non-limiting examples of polyunsaturated monomers include alkanepolyol-polyacrylates or alkane polyol-polymethacrylates such as oligoethylene glycol diacrylate, oligoethylene glycol dimeth-acrylate, trimethylol-propane diacrylate, trimethylolpropane dimethacrylate, trimethylol-propane triacrylate ("TMPTA") or trimethylolpropane trimethacrylate, and unsaturated carboxylic acid allyl esters such as allyl acrylate, diallyl maleate, and typically allyl methacrylate, and the like. Additional, non-limiting examples of polyunsaturated monomers are provided in U.S. Pat. No. 4,582,859.

The amount of polyethylenically unsaturated monomer added may be critical and varies depending upon the overall composition of the aqueous nanocomposite dispersion. For example, too low a level of the polyethylenically unsaturated monomer may produce excessive solubility and insufficient swelling in the ASE polymer clay nanocomposite whereas too high a level may produce an ASE polymer clay nanocomposite that is so tightly cross-linked that the microgel particles may not swell upon neutralization. In embodiments such as ASE nanocomposite dispersions, the amount of polyethylenically unsaturated monomer that is added may range from 0.01 to 5%, preferably from 0.01 to 3%, and more preferably from 0.01 to 1% by weight of overall monomer. In other embodiments such as core shell polymer clay nanocomposites, the amount of polyethylenically unsaturated monomer that is added may range from 0.1 to 10%, preferably from 0.1 to 5%, and more preferably from 0.1 to 2% by weight of overall monomer.

In certain embodiments of the present invention such as preparing a HASE polymer clay nanocomposite, one or more associative monomers may be added to the aqueous mixture(s). An "associative monomer", as used herein, relates to monomers having a hydrophilic segment, such as ethyoxylation or poly(ethoxylation-propoxylation), and a terminal hydrophobe functionality. Associative monomers may be prepared by coupling the hydroxyl end of a conventional nonionic surfactant with an ethylenically unsaturated monomer. Associate monomers may vary by altering, inter alia, the type of terminal hydrophobe, type of ethylenic unsaturation, ratio and degree of poly(ethyoxylation-propoxylation), and component-linking functionalities. Examples of associative monomers may include surfactant esters such as $C_8$–$C_{30}$ alkylphenoxy (ethyleneoxy)$_{6-100}$ ethyl (meth)acrylates and $C_8$–$C_{30}$ alkoxy (ethyleneoxy) $_{6-50}$ ethyl (meth)acrylates; $C_8$–$C_{30}$ alkylphenoxy ethyl (meth)acrylates; and $C_8$–$C_{30}$ alkoxy ethyl (meth)acrylates. Other linkages such as, but not limited to, ethers, amides and urethanes can be used. Associative monomers such as, but not limited to vinyl esters of $C_8$–$C_{30}$ carboxylic acid and $C_8$–$C_{30}$ alkyl ester of (methyl)acrylate can also be used. Further non-limiting examples of associative monomers include the polymerizable alkyl poly(oxyethylene) poly (carbonyloxyethylene) acrylates disclosed in U.S. Pat. No. 4,421,902; the (meth)acrylic acid ester of an alkoxylated ($C_8$ to $C_{30}$) alkyl, alkylaryl, polycyclic hydrocarbyl or complex hydrophobe alcohol having at least two oxyalkylene units and as many as 70 oxyalkylene units disclosed in U.S. Pat. No. 5,916,967; and the hydrophobic monomers disclosed in U.S. Pat. No. 6,063,857. The amount of associative monomer that is added may range from 1 to 20%, preferably from 1 to 15%, and more preferably from 1 to 10% by weight of overall monomer.

In certain embodiments, the aqueous mixture may include a polymer latex or polymer latex particle. In these embodiments, the polymer latex may be prepared, or polymerized, from any of the aforementioned monomers. Preferably, the polymer latex or polymer latex particles are polymerized in an aqueous medium in the presence of the clay particles. In one embodiment, the polymer latex is prepared via emulsion polymerization employing a monomer mixture including at least one polymerizable acid containing monomer, wherein the acid containing monomer may be selected from the group consisting of itaconic acid and dihydrogen phosphate esters of an alcohol, the alcohol containing a polymerizable olefinic group, phosphoric acid, or methacrylic acid. Additional monomers used in the polymer latex or polymer latex particles of the present invention are provided in, for example, WO 93/12184 Vogel et. al.

The aqueous or monomer mixture may further include an emulsifier. Suitable emulsifiers may include, but are not limited to, those conventionally used in emulsion polymerization, such as salts of alkyl-, aryl-, aralkyl-, alkaryl-sulfates or sulfonates; alkyl-, aryl-, aralkyl-, alkaryl-poly(alkoxyalkyl) ethers; alkyl-, aryl-, aralkyl-, alkaryl-poly (alkoxyalkyl) sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate. Further, the emulsifier used may be a nonionic or an anionic emulsifier used alone or in a mixture. Examples of the nonionic type of emulsifier include tert-octylphenoxyethylpoly(39)-ethoxyethanol, and nonylphenoxyethylpoly(40)ethoxyethanol. Examples of anionic emulsifiers include sodium lauryl sulfate, sodium dodecyl benzene sulfonate, tertoctylphenoxyethoxypoly(39) ethoxyethyl sulfate, sodium salt.

Optionally, at least one chain transfer agent may be added to either or both aqueous mixtures during polymerization to control the molecular weight of the polymer. Examples of chain transfer agents include, but are not limited to, mercaptans, polymercaptans, and polyhalogen compounds. Further, non-limiting examples of chain transfer agents include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; and halogenated compounds such as carbon tetrachloride, tetrachloroethylene, and tricholorobromoethane. Generally from 0 to 10%, preferably from 0 to 5%, and more preferably from 0 to 3% by weight based on the weight of the monomer mixture, can be used. The polymer molecular weight may also be controlled by other techniques, such as selecting the ratio of initiator to monomer.

Either or both aqueous mixtures may include an aqueous clay dispersion prior to polymerization of at least a portion of the monomer, or the aqueous clay dispersion may be admixed with the aqueous mixture after polymerization is complete. The aqueous clay dispersion may include from 0.1 to 200, more preferably from 1 to 60, even more preferably from 1 to 45, and most preferably from 1 to 25 weight percent of an unmodified clay based upon the total dry polymer weight in the aqueous polymer clay nanocomposite dispersion. The amount of water present in the aqueous clay dispersion is from 70 to almost 100 weight percent. In certain embodiments, the aqueous clay dispersion may also include a monomer mixture comprising at least one ethylenically unsaturated monomer, such as the monomers disclosed herein.

Suitable clays for the aqueous clay dispersion include any natural or synthetic layered mineral capable of being intercalated or exfoliated. Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation such as potassium, calcium, or sodium, present within their galleries that are attracted to the net negative charge of the clay surface. For example, clays like montmorillonite may be mined with a naturally occurring cation such as sodium or calcium. The terms "sodium form" or "calcium form" refer to clays that have an exchangeable cation which is sodium or calcium, respectively.

The cationic exchange capacity ("CEC") of the clay relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of about 40 meq/100 g or greater, preferably a CEC capacity of about 70 meq/100 g or greater, more preferably a CEC capacity of about 90 meq/100 g or greater, and even more preferably a CEC capacity of 100 meq/100 g or greater. In certain embodiments of the present invention, the CEC capacity of the clay may be increased, which enhances the affinity of the clay to the polymer within the nanocomposite dispersion, by electrochemically reducing the clay prior to the polymerization of at least a portion of the monomer.

Aqueous clay dispersions may be prepared by subjecting an aqueous clay mixture comprising at least one unmodified clay to shearing forces such as by mechanical mixing to partially and/or fully exfoliate the clay. Various high shearing methods to disrupt the physical integrity of clay particles in water to at least partially exfoliate the clay without requiring a modifying agent such as a surfactant are also envisioned. These methods include, but are not limited to, ultrasonication, megasonication, grinding/milling, high speed blending, homogenization, and the like. In certain embodiments, the aqueous clay dispersion may be subjected to shearing forces at temperatures which range from 10 to 150° C., preferably from 20 to 100° C., and more preferably from 20 to 90° C. to further aid in exfoliating the clay layers. Although such high shearing methods may be used in the process of the present invention, these methods are not required to achieve an at least partially exfoliated state. In the various embodiments of this invention, the clay may include both exfoliated clay layers and non-exfoliated clay particles.

In the present invention, the clays within the aqueous clay dispersion may be either partially or completely exfoliated. Preferably, the clay is an at least partially exfoliated clay. The term "at least partially exfoliated clay", as used herein, generally refers to clay in which the layers have been completely or partially separated from one another. By contrast, the term "non-exfoliated clay" generally refers to the physical state of clay which does not exist as separated layers. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the aqueous dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid rather than a viscous gel.

In the present invention, limiting the degree of exfoliation to less than 100% complete, i.e. partial exfoliation (less than 100%) typically provides clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a aqueous clay dispersion is typically less than a few percent by weight, preferably 5% or less, more preferably 4% or less, and even more preferably 3% or less, based on the total weight of the dispersion. Further exfoliation of the clay may take place during subsequent processing, such as in the step of emulsion polymerization. It is contemplated that the reduction of viscosity of the aqueous clay dispersion may be aided by dispersants, such as, but not limited to polyphosphates. These may be added during the polymerization process or to the polymerized products.

Often, moderate mechanical mixing not requiring high shear may be suitable to provide dispersions of an at least partially exfoliated clay in water. When fully exfoliated clays cause processing problems associated with the presence of high viscosities and/or gels in the reaction media, the degree of exfoliation should be less than complete. Likewise, to achieve the desired chemical and physical properties, the clay should be at least partially exfoliated. As well, the step of shearing clays in an aqueous environment typically results in a viscosity increase of the aqueous environment. Usually, the greater the degree of exfoliation the greater the increase in viscosity.

Besides increasing the degree of exfoliation of the clay, increasing the clay concentration within the aqueous nanocomposite dispersion may also result in increased viscosities. To this end, viscosity may be controlled by dilution of the reaction media and/or clay dispersion by a suitable liquid, such as water. Typically, it may be desirable to control the viscosity of reaction media and/or clay dispersion by dilution prior to the polymerization step(s). For example, to obtain a high level of clay enrichment in the nanocomposites of the present invention (e.g., clay amounts greater than 5% based on total weight polymer within the aqueous nanocomposite dispersion), the reaction media may be diluted with a sufficient amount of water prior to subsequent polymerization steps to reduce the viscosity. The amount of dilution that is necessary to achieve a particular viscosity level may be readily determined by those skilled in the art. Typically, to obtain an appropriate viscosity range prior to adding subsequent reactants, the solids concentration of the reaction media may be controlled to less than 50%, typically from 10% to 40%, and even more typically from 20% to 30%. In certain embodiments, the viscosity of the aqueous dispersion prior to adding the reactants may range up to 5,000 centipoises ("cps") using a Brookfield Viscometer and measured using a number 3 spindle at 60 revolutions per minute ("rpm").

In certain embodiments, a surfactant, may be added to the aqueous nanocomposite dispersion either prior to or after polymerization. Surfactants may also be added to an aqueous emulsion comprising a polymer seed prepared in accordance with the processes described herein to hydrophobically modify the clay within the emulsion. Typical surfactants have a hydrophilic head group and at least one oleophilic tail wherein the tails are selected from hydrogen and alkyl, alkenyl, and alkynyl groups having 4 to 30 carbon atoms. These surfactants may be used alone or in combination with each other such as in a mixture depending upon the compatibility of the other surfactants in the mixture or the other ingredients within the aqueous system. A listing of exemplary surfactants suitable for use in the present invention are provided in *McCutcheon's Detergents and Emulsifiers* (MC Publishing Co., Glen Rock, N.J.), published annually.

Typical surfactants may include nonionic, anionic, cationic, and amphoteric (zwitterionic) surfactants. Nonionic surfactants are surfactants having no charge when dissolved or dispersed in aqueous solutions. Typical nonionic surfactants include, for example, ($C_6$–$C_{18}$) alkylphenol alkoxylates (such as t-octyl phenol and nonylphenol ethoxylates having 1–70, and preferably 5–16, ethyleneoxide units), ($C_{12}$–$C_{20}$) alkanol alkoxylates and block copolymers of ethylene oxide and propylene oxide, and ($C_4$–$C_{18}$) alkyl glucosides as well as the alkoxylated products obtainable therefrom by alkoxylation, particularly those obtainable by reaction of alkyl glucosides with ethylene oxide. Anionic surfactants are surfactants having a hydrophilic functional group in a negatively charged state in an aqueous solution. Typical anionic surfactants include, for example, ($C_8$–$C_{18}$) alkyl carboxylic acids, ($C_{12}$–$C_{20}$) sulfonic acids (sulfonated alkylaryl compounds such as sodium dodecylbenzenesulfonate), ($C_{10}$–$C_{20}$) sulfuric acid esters (sulfated alcohols such as lauryl and cetyl sulfates, sodium salts), phosphate esters and salts thereof. Cationic surfactants contain hydrophilic functional groups where the charge of the functional groups is positive when dissolved or dispersed in an aqueous solution. Typical cationic surfactants include, for example, ($C_{12}$–$C_{20}$) amine compounds (such as lauryl pyridinium chloride, octylbenzyltrimethylammonium chloride and dodecyltrimethylammonium chloride) and oxygen containing amines. Further cationic surfactants may include onium salts such as, for example, salts comprising quaternary ammonium, quaternary phosphonium, or tertiary sulfonium cations or aliphatic mono-, di-, and polyamines derived from fatty and rosin acids. In the representative surfactants provided, the positive charge generally resides on an amino or quaternary nitrogen. Amphoteric or zwitterionic surfactants, such as for example cocamidopropyl betaine, contain both acidic and basic hydrophilic groups and may also be used in the present invention.

Some non-limiting examples of surfactants that may be used with certain embodiments of the present invention are found in U.S. Pat. Nos. 4,473,675 and 2,531,427. U.S. Pat. No. 4,473,675 discloses the use of quaternary ammonium compounds such as an admixture of a dimethyl di(hydrogenated tallow) ammonium compound and from 10% to 90% by weight of a dimethyl benzyl(hydrogenated tallow) ammonium compound to modify a clay. U.S. Pat. No. 2,531,427 discloses the use of onium compounds that are defined by the type RXHy, which are isologs of ammonium and contain the element X wherein X may be pentavalent as in ammonium, phosphonium, arsonium, and stibonium; tetravalent such as in oxonium, sulfonium, selenium, and stannonium compounds; trivalent such as in iodonium compounds and may be considered addition compounds of oxonium, carbonium, or stibonium. Further compounds provided in U.S. Pat. No. 2,531,427 include salts of aliphatic, cyclic, aromatic, and heterocyclic amines, primary, secondary, and tertiary amines and polyamines, and quaternary ammonium compounds such as monovalent or polyvalent onium compounds such as triphenylalkyl phosphonium-asonium-stibonium-halides, or dialkyl-, or aryl-sulphonium and selenonium halides and pyrones, such as 2,5-dialkyl gamma pyrone hydrochloride.

Buffers may also be present in the aqueous mixture during an emulsion polymerization. Buffers are generally the salts of weak acids such as, but not limited to, sodium bicarbonate, sodium carbonate or sodium acetate. The amount of buffer that may be present, if added, in the aqueous mixture may range from 0.01 to 5 weight percent based upon the total monomer used in the polymerization. Generally lower levels of a strong base, such as ammonia or sodium hydroxide, can also be used to control the pH of the polymerization. These agents may be added at any time either before, during, or after the polymerization step. Buffers may be further used to control hydrolysis of certain monomers, influence the extent of premature crosslinking during polymerization (as in the case when N-methylolacrylamide monomer is employed), influence the rate of decomposition of initiators, and/or affect the extent of dissociation of carboxylate acid monomers and surfactants to control colloidal stability.

II. Polymerization Techniques

In accordance with the methods of the present invention, the first and second aqueous mixtures, or aqueous emulsion and aqueous clay dispersion, are polymerized preferably via emulsion polymerization to form the alkali swellable or alkali soluble, high acid polymer clay nanocomposite dispersion. Emulsion polymerization techniques are discussed generally in R. G. Gilbert, *Emulsion Polymerization: A Mechanistic Approach*, Academic Press, NY ($1^{st}$ Edition, 1995) and El-Aasser, *Emulsion Polymerization and Emulsion Polymers*, John Wiley and Sons, NY (1997). The emulsion polymerization step is typically carried out in a suitable reactor wherein the reactants (monomers, initiators, emulsifiers, aqueous clay dispersion, and optional chain transfer agents) are suitably combined, mixed, and reacted in an aqueous medium, and wherein heat may be transferred in to, and away from, the reactor. The reactants are typically added slowly (gradually, as in a semi-batch process) over time, continuously, or quickly as a "shot" (batchwise) into the reactor. Typically, the reactants are gradually added ("grad-add") to the reactor. Continuous feeding by gradual addition of the aqueous mixtures into the reactor over a period of time ranging from 0.5 to 18 hours, preferably from 1 to 12 hours, and even more preferably from 2 to 6 hours, is useful for controlling reaction temperature.

In other embodiments, the aqueous polymer clay nanocomposite dispersions of the present invention may be polymerized through techniques other than emulsion polymerization. The aqueous polymer clay nanocomposite dispersions of the present invention may be polymerized by batch, solution, suspension, or mini-emulsion polymerization techniques. For example, polymer clay nanocomposite dispersions may be polymerized via bulk polymerization techniques, i.e., polymerization without added solvents or water. In other embodiments, solution polymerization techniques may be used if the heat of polymerization of the monomer or viscosity of the polymer is too high. Preferably, the polymerization occurs in an aqueous medium but other mediums, or solvents, may be used. However, some disadvantages with solution polymerization may be removal of the solvent at the completion of the reaction or chain transfer reactions with the solvent which may limit molecular weight.

In other embodiments of the present invention, the polymer clay nanocomposite dispersion may be polymerized by suspension polymerization. In these embodiments, the monomer is mechanically dispersed in a liquid medium and is polymerized as droplets. The liquid medium is preferably water, however other media, such as perfluorocarbons, may also be used. The addition of one or more stabilizers to the suspension, along with mechanical agitation, aid in preventing agglomeration of the monomer droplets. Further non-limiting examples of suspension polymerization are provided in George Odian, *Principles of Polymerization*, 2nd ed. John Wiley and Sons, NY (1981), pp 287–288.

Polymer clay nanocomposite colloids of the present invention may be prepared via mini-emulsion polymerization techniques. The term "colloid" as used herein refers to composite particles having a number average particle size ranging from 0.05 to 1 μm. The term "mini-emulsion polymerization", as used herein, generally relates to methods involving stable submicron oil-in-water dispersions in which the monomer droplets within the dispersion may range in size from 0.05 to 1 μm. Further discussion of mini-emulsion polymerization techniques is provided in "Mini-emulsion Polymerization" by E. D. Sudol et al., *Emulsion Polymerization and Emulsion Polymers*, John Wiley and Sons, NY (1997), pp. 700–722. The references, Erdem et al., "Encapsulation of Inorganic Particles via Mini-emulsion Polymerization", Proc. Am. Chem. Soc. (Div Polym Mater Sci Eng) 1999, 80, 583 and Erdem et al., "Encapsulation of Inorganic Particles via Mini-emulsion Polymerization. III. Characterization of Encapsulation", Journal of Polymer Science: Part A: Polymer Chemistry, Vol. 38, 4441–4450 (2000), provides some exemplary methods for mini-emulsion polymerization. The dispersion is typically obtained by shearing a system comprising oil, water, surfactant, and, optionally, a co-surfactant. Due to the small droplet size of the aqueous dispersion, it is believed that the monomer droplets within the mini-emulsion may become the dominant site for particle nucleation.

The stability of the monomer droplets within the mini-emulsion may arise from the use of a stabilizer in conjunction with an optional costabilizer. The stabilizer may include, for example, any of the surfactants mentioned herein. In embodiments where a costabilizer is used, the costabilizer is preferably a low molecular weight, water insoluble compound such as, for example, cetyl alcohol, hexane, or hexadecanol. The amount of surfactant that may be added to the mixture is from 0.1% to 10%, preferably from 0.5% to 5%, and more preferably from 1% to 4% by weight, based upon the weight of monomer within the mixture. The amount of co-surfactant, if added, to the mixture is from 0.1% to 15%, preferably from 1% to 10%, and more preferably from 2% to 8% by weight, based upon the weight of monomer within the mixture.

Various initiator systems are known in the art of free radical initiation and may be used in the polymerization methods described herein. The selection of the initiator system may vary depending upon the polymerization technique used. A thermal initiator, such as, but not limited to, a persulfate salt may be used. Alternatively, a free radical redox initiator system may also be employed. Examples of such systems include, for example, an oxidizing agent or oxidant such as a persulphate, azo, peroxide (e.g., hydrogen peroxide, t-butyl hydroperoxide, t-amylhydroperoxide), and the like, in combination with a reducing agent or reductant such as sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like.

The free-radical initiators which are typically used in the various steps of the process are those conventionally utilized in free-radical redox polymerizations conducted in the temperature range from 10° C. to 100° C., preferably from 20° C. to 95° C., and more preferably from 55° C. to 90° C. Temperatures higher than 100° C. are possible using equipment that is designed for elevated pressures. In some embodiments involving redox initiation, initiation temperatures are preferably kept below 85° C., more preferably below 55° C. for redox initiation. In other embodiments involving thermal initiation with persulfate salts, temperatures in the range 80° C. to 90° C. are used.

In certain embodiments, the present invention may use a redox process to initiate the modification of the clay surface and to aid in the polymerization of the monomer between the layers of the clay. A relatively large percentage of the weight of clay, typically 2% by weight or greater, comprises redox-active multivalent metal ions such as iron, copper, manganese, and the like, that are present within the galleries and/or the surface layers of the clay. These redox-active multivalent metal ions, inherent within the clay or added to the system, may be used to accelerate radical generation from redox-active initiator components. In the redox process, a clay containing metal ions such as $Fe^{II}$ or $Fe^{III}$ may be reacted in the presence of either an oxidant or a reductant, respectively, to form radicals. Redox-derived radicals will be formed in the spaces between the clay layers or at the clay surface and foster intercalation and/or exfoliation of the clay. Further, redox processes may generate polymer clay nanocomposites that exhibit higher degrees of film clarity than without redox.

In the redox process wherein a clay with $Fe^{II}$ is reacted in the presence of an oxidant, a chemical reductant is added to an aqueous mixture containing clay in its natural $Fe^{III}$ form and, optionally, a surfactant. Preferably, the amount of reductant added is in a sufficient quantity to reduce every mole of iron contained within the clay. Confirmation of the reduction of the clay from its $Fe^{III}$ to $Fe^{II}$ form may be made by observing a color change of the aqueous mixture. The aqueous mixture may become gray/green in appearance. Once the iron has been reduced, a chemical oxidant is added to the aqueous mixture along with one or more monomers. The interaction of $Fe^{II}$ with the oxidants causes an electrochemical reaction which results in the transfer of electrons from the iron associated with the clay to the oxidant. Reduction of the oxidant causes the oxidant to split into an anion and a redox derived radical which can then initiate polymer chains either at the surface of the clay or in the gallery space between clay layers. In this manner, the redox initiation system can be helpful in the intercalation and/or exfoliation of a polymer/clay nanocomposite. This redox process may be used to initiate the polymerization and/or sustain the polymerization throughout the entire nanocomposite formation. In addition, the redox process may be used to alter the CEC value of the clay.

In an alternative embodiment, a $Fe^{III}$ form clay is reacted in the presence of a reductant and a monomer emulsion seed is added to an aqueous mixture containing clay in its natural $Fe^{III}$ form. The reductant interacts with the $Fe^{III}$ groups of the clay and is oxidized which can cause radical formation and subsequent polymer chain initiation at or near the surface of the clay. Once the seed formation is complete, the nanocomposite latex is formed according to the standard methods disclosed herein. This redox process may also be used to initiate the polymerization and/or sustain the polymerization throughout the entire nanocomposite formation. In addition, the redox process may be used to alter the CEC value of the clay.

In certain embodiments wherein the redox system is the sole source of radicals, polymer chain growth may continue to be confined to regions near the clay surface to the extent that the iron is confined either to the clay plates or to the exchange spaces on the surface of the clay. The use of a reductant (such as sodium sulfoxylate formaldehyde, isoascorbic acid, and the like) and oxidant (such as ammonium persulfate, hydrogen peroxide, tert-butyl hydroperoxide, and the like) along with redox-active multivalent metal ions found in the clay or added separately is also a useful method for preparing the polymer/clay nanocomposites of the present invention.

In certain embodiments of the present invention, the first and second aqueous mixtures, or aqueous dispersion or emulsion and monomer mixture, are multi-stage emulsion polymerized. Such multi-stage emulsion polymerization preferably involves the sequential polymerization of two or more monomer mixtures wherein the monomers of the first monomer mixture are polymerized to more than 80%, preferably more than 90%, and even more preferably more than 95% degree of conversion to form a polymer particle dispersion. This polymerization is preferably followed by the polymerization of an additional monomer mixture containing the clay dispersion in the presence of the polymer particle dispersion to form additional polymers which may associate with the polymer particles (e.g., polymer shells around or domains within the polymer particles) and/or form additional polymer particles.

In another aspect of the present invention, an aqueous dispersion may be prepared by a multistage emulsion polymerization process, in which at least two stages that differ in composition are polymerized in sequential fashion. Such a process usually results in the formation of at least two mutually incompatible polymer compositions, thereby resulting in the formation of at least two phases within the polymer particles in the aqueous nanocomposite dispersion. Such particles are composed of two or more phases of various geometries such as, for example, core/shell or core/sheath particles, core/shell particles with shell phases incompletely encapsulating the core, core/shell particles with a multiplicity of cores, and interpenetrating network particles wherein the two or more phases such as the core and the shell are associated with each other. The term "associate", as used herein, relates to the relationship between the core and shell within the polymer clay nanocomposite particles wherein at least a portion of the core and at least a portion of the shell is covalently or non-covalently associated with the each other. Each of the stages of the multi-staged emulsion polymers within the aqueous nanocomposite dispersion may contain the same monomers, surfactants, redox initiation system, chain transfer agents, etc. as disclosed herein for the emulsion polymer. The polymerization techniques used to prepare such multistage emulsion polymers are well known in the art such as, for example, U.S. Pat. Nos. 4,325,856; 4,654,397; 4,814,373; 4,876,313; 4,916,171; 5,454,695; and 6,252,004. During this step, it should be appreciated that the first and second aqueous mixtures may be multi-stage polymerized in either order. For preparing nanocomposite compositions in the form of dry powders it is preferable that the monomer(s) within the clay-containing mixture, or second aqueous mixture, is polymerized after the monomer(s) within the first aqueous mixture.

In one embodiment of the present invention, the clay may be at least partially exfoliated during polymerization of the monomers in the aqueous mixture which contains the monomer and the unmodified clay. In this embodiment, the aqueous clay and monomer mixture may be the first stage of the multi-stage polymerization so that the inner polymer core portion of the multi-stage polymer will preferably contain at least a portion of the unmodified clay. In another embodiment, this aqueous clay and monomer mixture may be the second stage of the multi-stage polymerization so that the outer polymer shell portion of the multi-stage polymer will typically contain at least a portion of the unmodified clay. In further embodiments, both stages may contain the unmodified clay.

In one embodiment of the process of the present invention, the first aqueous mixture may be polymerized to form a first stage emulsion polymer core particle having a particle diameter of 20 to 7000 nanometers, preferably 50 to 2000 nanometers, and even more preferably 50 to 800 nanometers. In this embodiment, the core polymer is 0.1 to 99%, preferably from 5 to 95%, more preferably 10 to 90%, based on dry weight of the total dry polymer weight in the nanocomposite dispersion, and a second aqueous mixture may be polymerized to form a second stage emulsion polymer shell around said core particle.

Larger core shell nanocomposites, e.g. 1,000 nanometers or greater, may be formed by polymerization techniques other than emulsion polymerization. These larger core shell nanocomposites may be formed via suspension polymerization as disclosed herein or via "swelling techniques" such as the techniques disclosed, for example, in "Aqueous Dispersions of Polymer-Oligomer Particles", Polymer Colloids II, Robert Fitch editor, Plenum Press, New York, N.Y., 1980, pp. 83–93. For example, a latex may be prepared by conventional emulsion polymerization techniques. After polymerization, the latex is then swollen with monomer and a chain transfer agent and the monomer is then polymerized to form an oligomer in an aqueous dispersion. The aqueous dispersion of the oligomer and an emulsifier is then swollen with monomer and polymerized to provide larger sized particles. Clay may be added at some point during the process to provide a large core shell nanocomposite. These larger core shell nanocomposites may be useful as-is or, for example, as cores in plastics additives.

In another embodiment of the present invention, a nanocomposite polymer composition having a core-shell morphology is provided containing a rubbery first stage polymer and a second stage nanocomposite shell. This nanocomposite polymer composition may contain from 1 to 99, preferably 30 to 70, more preferably 35 to 60, and even more preferably from 35 to 45 parts based on weight of a rubbery first stage core polymer, and from 99 to 1, preferably 70 to 30, more preferably from 40 to 65, and even more preferably from 55 to 65 parts based on weight of a second stage nanocomposite shell. The term "parts" used herein is intended to mean "parts based on weight".

In the core-shell nanocomposite polymer composition, the rubbery first stage core polymers contain from 45 to 99.9, preferably from 80 to 99.5, and even more preferably from 94 to 99.5 weight percent of units derived from at least one $C_1$–$C_8$ alkyl acrylate monomer. These polymers also contain from 0 to 35, preferably from 0 to 20, and even more preferably from 0 to 4.5 weight percent of units derived from at least one ethylenically unsaturated copolymerizable monomer different from the at least one $C_1$–$C_8$ alkyl acrylate monomer. These first stage core polymers further contain from 0.1 to 5, preferably from 0.1 to 2, and even more preferably from 0.5 to 1.5 weight percent based on weight of units derived from at least one polyunsaturated monomer.

In the core-shell nanocomposite polymer composition, the second stage nanocomposite shell has a percent weight of unmodified clay to the total monomer and clay weight in the range of from 0.05% to 20%, preferably from 0.2% to 15%, and even more preferably from 0.5% to 10%, with the balance a polymer derived from at least one ethylenically unsaturated units selected from the group consisting of $C_1$–$C_{18}$ alkyl (meth)acrylate, acrylic acid, methacrylic acid, butadiene, and vinyl aromatic monomers. In this embodiment, the shell is typically hard; hard shells generally allow the nanocomposite polymer compositions to be provided in a dry powder form. Dry powder forms of nanocomposites containing relatively soft shells can be provided using various powder flow aids as is known in the art of powder preparation. Moreover, the shell may be hard or soft if the nanocomposite polymer is used in its aqueous dispersion form (e.g., coating, adhesives, caulks, sealants, and plastics additives).

In yet a further embodiment of the present invention, either the polymer core or shell composition may be polymerized from an aqueous dispersion comprising at least one clay, an ethylenically unsaturated monomer, and optionally at least one surfactant. In addition, the polymer core or shell composition may contain at least 10 weight percent of the acid containing monomer. Further, either the polymer core or shell compositions may further contain a polyunsaturated monomer. In preferred embodiments, the polyunsaturated monomer may comprise a graft-linking monomer, such as for example, allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-alkyl-, aryl-, P-vinyl-, P-allyl, P-crotyl-, and P-methallyl-phosphonates; triallyl-, trimethallyl-, and tricrotyl-phosphates; O,O-diallyl-, dimethallyl-, and dicrotyl-phosphates; cycloalkenyl esters of acrylic, methacrylic maleic (mono- and di-esters), fumaric (mono- and di-esters), and itaconic (mono- and di-esters) acids; vinyl ethers and thioethers cycloalkenols and cycloalkene thiols; vinyl esters of cycloalkene carboxylic acids; 1,3-butadiene, isoprene, and other conjugated dienes; paramethylstyrene; chloromethylstyrene; allyl-, methallyl-, vinyl-, and crotyl-mercaptan; bromotrichloromethane; bromoform; carbon tetrachloride; and carbon tetrabromide.

The polymer core or shell polymerized from the aqueous dispersion containing the acid containing monomer may exhibit a Tg of 30° C. or greater, whereas the polymer core or shell polymerized without the acid containing monomer, or with less than 10 weight percent of the acid containing monomer, may exhibit a Tg of below 30° C. Glass transition temperatures may be calculated by using the Fox equation (see T. G. Fox, Bull. Am. Physics Soc., Vol. 1, Issue No. 3, page 123(1956)). In certain embodiments, the high acid-containing core may diffuse to become, or be incorporated, into the shell.

In certain embodiments of the present invention, the first aqueous mixture, or aqueous emulsion, may comprise a pre-formed polymer dispersion ("seed" latex), for controlling the desired particle size. Seeds are also typically used for controlling the structure and/or morphology of the resulting polymer. The "seed" latex may comprise small particles depending upon the desired use of the resulting emulsion polymer. In certain embodiments, the particles may have a mean diameter less than 200 nm, preferably less than 100 nm, and even more preferably less than 65 nm. In other embodiments, such as when larger emulsion polymer particle size is desired, the particles may have a mean diameter less than 250 nm, preferably less than 200 nm, and even more preferably less than 110 nm. Typical seed latex particles may have a composition similar to, or different than, the composition of the monomers used in preparing the first stage of the multistage nanocomposite or the first stage of a seeded single stage nanocomposite polymer. The "seed" latex may be an aqueous polymer clay nanocomposite dispersion prepared from the processes disclosed herein. The pre-formed polymer dispersion may include polymer particles of a rubbery material, and may be similar or different in composition to the core polymer. The term "rubbery", as used herein, denotes the thermodynamic state of a polymer above its glass transition temperature. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

In one embodiment of the present invention, an aqueous polymer clay nanocomposite dispersion is prepared by adding, preferably via gradual addition, a monomer emulsion to an aqueous emulsion comprising a polymer seed and at least one modifying agent. The monomer emulsion in this embodiment may comprise at least one ethylenically unsaturated or other monomer described herein. Exemplary modifying agents can be any of the modifying agents used to hydrophobically modify a clay, i.e., surfactant, silane, etc., disclosed herein. The polymer seed in this embodiment may be a high acid, aqueous polymer clay nanocomposite dispersion prepared according to the processes of the present invention. The polymer seed may be modified through the addition of a modifying agent. It is believed that the transport of the modifying agent through the aqueous medium may be faciliated through a transporting agent such as, but not limited to, a nonionic surfactant or cyclodextrin, for example, β-cyclodextrin.

Another process of the present invention involves the gradual addition and polymerization of an aqueous dispersion comprising at least one ethylenically unsaturated monomer, wherein at least one of the ethylenically unsaturated monomers is an acid containing monomer, and optionally a polyunsaturated monomer and an unmodified, layered clay to an aqueous emulsion comprising one or more emulsion polymer seeds and at least one modifying agent such as a surfactant. In certain embodiments, the emulsion polymer seeds may be prepared by any of the processes disclosed herein. The emulsion polymer seeds preferably have a particle diameter of 20 to 500 nm, more preferably 30 to 400 nm, and even more preferably 40 to 300 nm. The emulsion polymer seeds are from 0.1 to 10%, preferably 0.5% to 8%, even more preferably 1% to 5% based on dry weight of the total polymer weight in the aqueous emulsion. While polymer seeds may not contain clay, this embodiment further envisions that the polymer seeds may contain up to 200% clay based on dry weight of the total polymer weight in said nanocomposite dispersion.

The aqueous emulsion is combined with the aqueous dispersion and the monomer is polymerized thereby forming the aqueous polymer clay nanocomposite dispersion. After polymerization of each stage it is desirable that at least 95%, preferably at least 97%, and even more preferably at least 99% based on weight of the monomer is polymerized in a reactor before a subsequent polymerization stage is begun.

The emulsion polymer seeds may be formed in the same reactor vessel where the monomers are polymerized and/or prepared in a separate reactor vessel and subsequently introduced to the reactor vessel where the monomers are polymerized. In a further embodiment, the polymer seeds may contain an at least partially exfoliated, unmodified layered clay. In this embodiment, the amount of clay is in the range of from 0.01% to 200%, preferably from 1% to 60%, more preferably 1% to 45%, and even more. preferably from 1% to 25% based on dry weight of total dry polymer weight in the polymer seeds. In embodiments where the polymer seeds of the aqueous emulsion are formed in the same reaction vessel in which the monomer is polymerized, the aqueous clay dispersion may comprise up to 200 weight percent based on dry weight of a layered clay. The lower percentage solids within the reactor vessel allows one to add higher clay levels while maintaining a usable viscosity.

The present invention also encompasses nanocomposite polymer particles that are formed in prior polymerization or additional polymerization stages. These stages may occur before, during, or after the formation of the stage containing the clay. Accordingly, the first stage core polymer particle may contain a rubbery polymer. Aqueous dispersions of nanocomposites containing rubbery polymers materials are useful in a number of applications, such as: plastics additive impact modifiers; thermoplastic resins having flexibility and/or good impact strength such as for capstock applications; thermoplastic elastomers; binders for coatings, caulks, sealants, and adhesives, and the like. For preparing materials that have a rubbery component, it is desirable that the glass transition temperature of at least one constituent polymeric phase be less than the use temperature (e.g., ca. 25° C. for applications used at ambient conditions). The selection and amount of monomers required for controlling the glass transition may be readily determined through use of the Fox equation that is well known in the polymer art.

The polymers may also contain at least one additional polymer derived from at least one of any of the aforementioned ethylenically unsaturated copolymerizable monomers to form copolymers (e.g., random copolymers, block copolymers, graft copolymers, star polymers, and various combinations thereof).

The polymer nanocomposite powders of the present invention may also be isolated from the nanocomposite polymer particle dispersions in various ways. Some non-limiting examples of powder isolation methods include spray-drying or coagulation. Additional techniques to isolate the polymer nanocomposite particles include, for example, the techniques disclosed in U.S. Pat. No. 4,897,462. These techniques may also be applied to the emulsion during isolation to produce a spheroidal product which, when dried, exhibits outstanding powder flow, low dusting, and higher bulk density than conventionally isolated powders.

The polymer nanocomposite powders may further contain from 0 to 5 parts based on weight of a powder flow aid. Suitable powder flow aids may be incorporated in the spray drying process used for recovering dry powder capstock compositions. One non-limiting example of a powder flow aid is stearic acid-coated calcium carbonate. The reference, U.S. Pat. No. 4,278,576, also provides further examples of flow aids that may be useful for spray drying emulsions of polymer particles.

The process of the present invention is typically used for preparing nanocomposite resin powders having the requisite processing and physical characteristics of thermoplastic resin. As described above, dry powders of the nanocomposite polymers are typically prepared by recovering the particles either by spray drying or by coagulation followed by wet-cake drying. These nanocomposite polymers may be recovered separately as individual powders which are subsequently mixed together using a suitable powder mixing device (e.g., ribbon blender) to prepare a dry powder mixture which may be used as a thermoplastic resin. Alternatively, the separate unmodified aqueous clay dispersions and clay-free emulsion polymers may be blended in the emulsion state and subsequently recovered as a mixed dry powder blend by either co-spray drying or coagulation followed by drying.

Additional components in the nanocomposite resin composition, such as UV stabilizers, pigments, PVC resin, matting agents, flow aids, processing aids, lubricants, fillers, and the like, may be blended in either powder or liquid form with the nanocomposite resin powders. These components may be used, for example, in base resins for a capstock composition. Individual additives, such as, for example, a UV light stabilizer, may be emulsified, added to the nanocomposite resin particle dispersions, and co-spray-dried. Alternatively, emulsified additives, such as pigment dispersion may be added directly to nanocomposite resin powders in a suitable mixing device which allows for the addition of heat and the removal of water. Likewise, PVC wetcake may also be blended with powder or aqueous-based nanocomposite resin particle dispersions. Numerous combinations of mixing emulsion-based additives and powders followed by subsequent drying may be envisioned by one skilled in the art.

In another embodiment a pelletized form of the polymer nanocomposite composition is envisioned. Such pellets may be used, for example, in preparing thermoplastic film, sheet, and other various articles. In some circumstances, pellet-forms of the polymer nanocomposite may be more desirable than using a powder-form to avoid certain problems common to powders, such as dust formation. Accordingly, powders may be formed into pellets using any suitable plastics pelletization equipment or other methods known in the plastics processing art. These pellet forming steps may be combined with the mixing step wherein the components of the polymer nanocomposite resin composition may be compounded (mixed) and then pelletized using standard plastics processing equipment.

The aqueous nanocomposite clay-polymer dispersions of the present invention may also be prepared utilizing inverse emulsion polymerization. The processes described in, for example, U.S. Pat. Nos. 3,284,393; 3,826,771; 4,745,154, and accompanying references therein, can be utilized incorporating clay into the aqueous phase of these polymerizations when used to make an acid containing polymer (high or low levels of acid). Other water soluble polymers modified by clay, such as polyacrylamide, may be prepared by this approach. Inverse emulsion polymerization methods may yield high molecular weight polymers or copolymers based on the water soluble monomers and mixtures comprised thereof. An aqueous solution of these monomers may be dispersed in an oil phase by means of a water in oil emulsifier and subsequently polymerized under free radical forming conditions.

In other aspects of the present invention, the emulsion polymer of the nanocomposite may be prepared by an emulsion polymerization process which is executed in such a manner to produce a bimodal or mutimodal particle size distribution as is taught in U.S. Pat. Nos. 4,247,438; 4,657,966; and 5,498,655, a bimodal or multimodal molecular weight distribution as is taught in U.S. Pat. Nos. 4,501,845 and 5,990,228, or non spherical particles such as, for example, rods as are taught in U.S. Pat. No. 5,369,163 and multilobal particles as are taught in U.S. Pat. No. 4,791,151.

In another aspect of the present invention, a hollow polymer clay nanocomposite, or opaque polymer clay nanocomposite, may be prepared by a process which produces particles which when dry contain at least one void such as, for example, particles having a single void, multi-voided particles, and particles having interpenetrating networks of void and polymer (polymer "sponge"). In this connection, the hollow polymer clay nanocomposite may be formed via any of the methods disclosed, for example, in U.S. Pat. Nos. 4,468,498; 5,545,695; and 6,252,004 and accompanying references therein. Preferably, the hollow polymer clay nanocomposite is formed by providing an aqueous emulsion of a multi-stage emulsion polymer comprising: a core stage polymer comprising an aqueous polymer clay nanocomposite composition comprised of polymerized units of at least 10 weight percent of an acid containing monomer, an at least one unmodified clay, at least one ethylenically unsaturated monomer, and at least one modifying agent; and a shell stage polymer comprising polymerized units of at least one ethylenically unsaturated monomer. The clay is preferably hydrophobically modified via a modifying agent such as a surfactant prior to the formation of the shell stage polymer. The core stage polymer is then swollen with at least one swelling agent and optionally at least one ethylenically unsaturated monomer such that at least a portion of the core stage polymer contacts at least a portion of the shell stage polymer. The swelling agent may include polymerizing the monomer to form the polymer clay nanocomposite particles which become hollow upon drying.

In addition to the acid containing monomer, suitable ethylenically unsaturated monomers may include styrene, α-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth) acrylate, palmityl (meth)acrylate, stearyl (meth)acrylate and the like. The core may also optionally contain less than 20 percent by weight, preferably from 0.1 to 3 percent by weight, based on the total weight of the core, of polyethylenically unsaturated monomer.

The core, whether obtained by a single stage process or a process involving several stages, has an average particle size of from 50 mm to 1.0 micron, preferably from 100 nm to 300 nm, diameter in unswollen condition. If the core is obtained from a seed polymer, the seed polymer preferably has an average particle size of from 30 nm to 200 nm.

As mentioned previously, the core stage polymer is swollen with at least one swelling agent and at least one ethylenically unsaturated monomer such that at least a portion of the core stage polymer contacts at least a portion of the shell stage polymer. The swelling, or expansion, of the core may involve partial merging of the outer periphery of the core into the pores of the inner periphery of the shell and also partial enlargement or bulging of the shell and the entire particle overall. Suitable swelling agents include, are those which, in the presence of the multistage emulsion polymer and monomer, are capable of permeating the shell and swelling the core. Swelling agents may be aqueous or gaseous, volatile or fixed bases or combinations thereof. Suitable swelling agents include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. The amount of swelling agent can be less than, equal to or greater than the amount needed to provide for complete neutralization of the core. Preferably, the amount of swelling agent is in the range of from 75 to 300 percent, more preferably in the range of from 90 to 250 percent based on the equivalents of the functionality in the core capable of being neutralized. It is also preferable to add the one or more swelling agents to the multistage emulsion polymer while the multistage emulsion polymer is at an elevated temperature, preferably at a temperature within 10° C. of the shell polymerization temperature. Swelling is generally very efficient under conditions of elevated temperature, in the presence of an ethylenically unsaturated monomer, such as the monomers disclosed herein, and no substantial polymerization occurring. Under these conditions, swelling is generally complete within 30 minutes, preferably within 20 minutes, most preferably within 10 minutes of adding the one or more swelling agents. After the core stage polymer is swollen, the monomer is then polymerized to form the polymer clay nanocomposite particles that become hollow after drying.

The high acid, aqueous polymer clay nanocomposite is neutralized via a neutralizing agent or basic compound, preferably after the polymerization step is completed, prior to use. Any alkaline material suitable for raising the pH of an aqueous dispersion of the thickener composition to 7 or higher may be utilized. Suitable neutralizing agents include, for example, alkalis such as sodium potassium or lithium hydroxide; a volatile amine such as triethyl amine, or triethanol amine; or ammonium hydroxide, used alone or in admixture. Further exemplary neutralizing agents include, but are not limited to, water soluble bases, such as primary, secondary, or tertiary amines, or hydroxides of a pyridine base or a quaternary ammonium used alone or in admixture. The neutralizing agent may be added to the polymer clay nanocomposite dispersion through combining an aqueous solution having the neutralizing agent into the dispersion. Alternatively, the neutralizing may be added neat. The neutralization step may be carried out to a pH of as high as 13 if desired, however, no special benefit is seen from neutralizing beyond about 7. For certain applications such as thickeners, at least about 0.5 equivalents of an agent for neutralizing the copolymer will be effective but more or less of the neutralizing agent may be used according to the thickening effect desired, since the relationship between the degree of neutralization and the viscosity increase is believed to be linear.

Another process of the present invention involves preparing an aqueous nanocomposite dispersion by admixing an aqueous emulsion polymer comprising at least 10 weight percent or greater of an acid containing monomer and at least one polyunsaturated monomer and an aqueous dispersion comprising 0.1 to 10% based on dry weight of said emulsion polymer, of a layered clay. In this process, the aqueous emulsion polymer is typically prepared according to any of the various known methods of preparing emulsion polymers according to the art of emulsion polymerization. In one embodiment of this process, it is typical that the nanocomposite dispersions are prepared using gradual addition "grad-add" processes. In this embodiment it is also typical that the nanocomposite polymers are prepared by multi-stage polymerizations, such as core-shell polymer particles having a rubber core and a hard shell. In this embodiment, the amount of clay is in the range of from 0.05% to 20%, preferably from 0.1% to 15%, and even more preferably from 0.1% to 10% based on dry weight of total dry polymer weight in the polymer clay nanocomposite seeds.

The admixing step of the modified layered clay in this embodiment is preferably completed without the need for a modifying agent such as a surfactant. In another embodiment, the clay is predispersed in water and admixed with the aqueous emulsion polymer. Any mechanical mixing device may be suitable as long as the clay particles are at least partially exfoliated. More preferably, the clay particles are mixed to uniformly disperse the clay within the nanocomposite dispersion. For example, a COWLES® mechanical mixer may be used to prepare aqueous clay dispersions containing up to 20% clay, however it is more preferable to use a mechanical homogenizer to prepare aqueous clay dispersions containing from 0.1 to 10% clay.

In certain preferred embodiments of the present invention, the aqueous dispersion of clay is added prior to the neutralization step. In these embodiments, it is believed that the clay is better dispersed at low pH. In embodiments where the aqueous dispersion of clay is added after the neutralization step, it is preferred that the clay mixture be dispersion in heated water at temperatures of 65° C. or greater prior to the admixing step.

In certain embodiments of the present invention, at least a portion of the aqueous mixture comprising one or more monomers and a clay dispersion is polymerized via any of the techniques disclosed herein to provide an aqueous polymer clay nanocomposite dispersion. The resultant aqueous polymer clay dispersion comprises a polymer latex having at least 10% polymerized units of at least one acid containing monomer and a clay dispersion comprising at least one clay wherein the clay layers are at least partially exfoliated by the polymerization of the latex. The viscosity of this nanocomposite dispersion after neutralization is higher than a comparable nanocomposite dispersion of the same composition in which the polymer latex and the clay dispersion are admixed. Further, the haziness, or light scattering, of the nanocomposite dispersion after neutralization is less than a comparable nanocomposite dispersion in which the polymer latex and the clay dispersion is admixed.

III. Applications

The alkali swellable or alkali soluble, aqueous nanocomposite clay-polymer dispersions of the present invention may be used in a variety of applications which incorporating high levels of acid functionality. These polymer compositions are useful as additives in water based systems as thickeners (see, for example, U.S. Pat. No. 4,421,902 and references therein), dispersants (see, for example, U.S. Pat. Nos. 5,326,843 and 3,037,952 and references therein) and binders (see, for example, U.S. Pat. Nos. 5,326,843 and 4,876,313 and references therein) as well as coatings, inks, adhesives and the like. When the nanocomposite compositions prepared in accordance with the methods of the present invention are incorporated into high acid polymer compositions, the resultant polymer may increase in hardness. This imparts properties such as enhanced block resistance (i.e., the coating will not stick to itself or other items) when used in a paint composition. Ink binders, that are comprised entirely or partially of high acid polymers, will exhibit enhanced heat seal resistance (block resistance at elevated temperature) and toughness when the nanocomposite compositions are added to the binder composition. In yet another embodiment utilizing high acid polymers, the nanocomposite compositions of the present invention may be used as dry powder polymer cement modifiers (such as described in, for example, EP0654454 and references therein).

In one embodiment of the present invention, a coating composition containing an aqueous nanocomposite dispersion is prepared. The coating compositions comprising aqueous nanocomposite clay-polymer dispersions may exhibit improved properties like block, print and dirt pick-up resistance, enhanced barrier properties, and enhanced flame retardence. Additionally, the coating compositions comprising the aqueous nanocomposites of the present invention may have the ability to utilize softer binders, without the need for additional coalescent (solvents) for film formation, and still maintain sufficient hardness, toughness and lower tack in a dried film. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in the range from 0° C. to 70° C.

The coating compositions of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis. The coating composition may be prepared by techniques that are well known in the coatings art. First, optionally, at least one pigment is dispersed within an aqueous medium under high shear such as is afforded by a COWLES® mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0–200%, based on dry weight of the total dry polymer weight in the nanocomposite dispersion.

The solids content of the coating composition may be from 10% to 70% by volume. The viscosity of the coating composition may be from 0.05 to 100 Pascal-seconds (Pa.s), or 50 to 100,000 centipoise (cP), as measured using a Brookfield viscometer; the viscosities appropriate for different application methods vary considerably.

The coating composition may be applied by conventional application methods such as, but not limited to, brushing and spraying methods, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in "green" or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80° C. to 80° C. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80° C. to 0° C. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50° C. to 50° C. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, and silk screens.

In another embodiment of this invention, a nonwoven fabric binder containing an aqueous nanocomposite dispersion is contemplated. The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the nanocomposites have glass transition temperatures in the range of from −60° C. to 50° C. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0° C. to 50° C. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50° C. to 50° C. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

EXAMPLES

Example 1
Alkali Soluble Resin with 4.5% of Unmodified Clay

A latex was synthesized via the following method: An empty reactor kettle was charged with, while stirring, 460.8 g of deionized water, 0.90 g of an anionic surfactant (33% aqueous solution), and 7.0 g (4.5 weight percent) of a unmodified sodium montmorillonite clay sold under the trade name "PGV Clay" by Nanocor of Arlington Heights, Ill. The kettle contents were heated to 85° C. and held for 10 minutes, then a solution of 1.2 g sodium acetate in 15.0 g of DI water was added with continued stirring and heating, holding the reactor contents at 85° C. for 5 additional minutes. In a separate vessel, a monomer emulsion was formed containing: 44.2 g water, 8.2 g anionic surfactant (33% aqueous solution), 15.0 g styrene, 97.5 g methyl methacrylate ("MMA"), 37.5 g methacrylic acid ("MAA") and 0.051 moles of an alkyl mercaptan to control molecular weight to obtain a MN of 3000 to 4000 and MW of 9000 to 12000 as measured by gel permeation chromotagraphy ("GPC"). A 8.40 g quantity of the monomer emulsion was added to the kettle to form a polymer seed. Then, 0.75 g sodium persulfate dissolved in 7.5 g water was added to initiate polymerization. The monomer emulsion was gradually fed into the kettle such that a reactor temperature of 85° C. was maintained. After monomer feeds were completed, the batch was cooled to 65° C. Upon reaching 65° C., 1.9 g ferrous sulfate (0.15% aqueous) was added to the reactor. Then, a 0.19 g quantity of 70% tert-butyl hydroperoxide in 5.5 g of water was added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water was added. After cooling, the sample was filtered through a 325 mesh screen to remove any large pieces of coagulated material, no measurable quantity was present. The resulting latex had a 22% solids content, pH of 4.2 and particle size of 156 nm. The latex was neutralized to a pH of 9.5. The viscosity of the ammonia neutralized, polymer clay nanocomposite is reported in the Table I.

Comparative Example 2
Alkali Soluble Resin without Unmodified Clay

A latex was prepared in the same manner as Example 1 except that no clay was added to the reaction kettle. The initial quantity of deionized water added to the reaction kettle was reduced to produce a 40% solids latex.

Examples 3 through 4
Alkali Soluble Resin with 10% and 15% of Unmodified Clay Two latexes were prepared in the same manner as Example 1 except that 10 weight percent and 15 weight percent of an unmodified, sodium montmorillonite PGV clay, respectively, based on polymer solids, were added to the reaction kettle. The latex was neutralized to a pH of 9.5. The viscosities of the resultant, ammonia neutralized polymer clay nanocomposites are reported in Table I below.

Examples 5 through 7
Unmodified Clay Admixed with an Alkali Soluble Resin—Clay—Added before Neutralization The product of Example 2 was blended with an unmodified, sodium montmorillonite PGV Clay at weight percentage levels of 4.5% (Example 5), 10% (Example 6) and 15% (Example 7) clay based on polymer solids. The clay was stirred with DI water (95 g clay/905 g DI water) at 85° C. for 4 hours to form an aqueous clay dispersion. The aqueous clay dispersion is then blended, with stirring, with the latex product of Example 2. The blends were then neutralized to a pH of 9.5. The viscosities of the ammonia neutralized resultant polymer clay nanocomposites are reported in Table I below.

Examples 8 through 10
Unmodified Clay Admixed with a Neutralized Alkali Soluble Resin—Clay Added after Neutralization The alkali soluble resin of Example 2 was neutralized with ammonium hydroxide, at about 28% solids, to reach a pH of 9.5. An unmodified, sodium montmorillonite PGV Clay was added to the neutralized resin, at weight percentage levels of 4.5% (Example 8), 10% (Example 9) and 15% (Example 10) clay based on polymer solids, along with sufficient water to produce a 21% solids mixture. The blend was heated and stirred at 85° C. for 4 hours, then cooled. The viscosities of the ammonia neutralized, polymer clay blends are reported in Table I below.

Examples 11 through 12
Unmodified Clay Blended with a Neutralized Alkali Soluble Resin—Clay Dispersed in Heated Water The alkali soluble resin of Example 2 was neutralized with ammonium hydroxide, at about 28% solids, to a pH of 9.5. A 95 g quantity of an unmodified, sodium montmorillonite PGV Clay was added to a 905 g quantity of DI water and stirred at 85° C. for 4 hours to yield an aqueous dispersion of a partially exfoliated clay. This clay dispersion was blended with the neutralized resin (neutralized with ammonium hydroxide, at about 28% solids, to a pH of 9.5) of example 2, at levels of 4.5% (Example 11) and 10% (Example 12) clay on polymer solids, along with sufficient water to produce a 21% solids mixture. The blend was stirred for 2 hours. The viscosity of the ammonia neutralized polymer/clay blend is reported in Table I below.

Viscosity Data—Table I

The viscosity of the samples of the above Examples was measured, after equilibration at a temperature of 25° C., on a Brookfield Viscometer using spindle 4 at 60 rpm.

TABLE I

Viscosity Data

| Example | Manner of Clay Addition | Weight Percent Clay | Viscosity (cps) | Percentage Solids |
|---|---|---|---|---|
| 1 | In situ | 4.5 | 240 | 21 |
| Comparative 2 | — | — | 240 | 27 |
| 3 | In-situ | 10 | 3900 | 21 |
| 4 | In-situ | 15 | 8600 | 21 |
| 5 | Admixed | 4.5 | 240 | 21 |
| 6 | Admixed | 10 | 1100 | 21 |
| 7 | Admixed | 15 | 4200 | 21 |
| 8 | Admixed | 4.5 | 10 | 21 |
| 9 | Admixed | 10 | 10 | 21 |
| 10 | Admixed | 15 | 10 | 21 |
| 11 | Admixed | 4.5 | 20 | 21 |
| 12 | Admixed | 10 | 85 | 21 |

As Table I shows, Examples 3 and 4, or the latexes in which the clay was in situ prior to polymerization, compared with Examples 6 and 7, or the latexes in which the clay was dispersed in hot water than blended with an unneutralized latex, exhibited higher viscosities. The higher viscosities of Examples 3 and 4 relative to Examples 6 and 7 may indicate that these nanocomposites contain a more exfoliated clay which may occur during the polymerization step. Additionally, the visual inspection of test coupons of Examples 1, 3, and 4 are slightly less hazy than Examples 5, 6, and 7 which further indicates that the polymerization step aids in exfoliating the clay. The viscosity of samples from Examples 1 and 5 are the same value because both samples may be at a solids level that produces a viscosity in a region where viscosity is less sensitive to factors such as solids level, clay exfoliation, and the like. It is expected that the samples from Examples 1, 3, and 4 will also exhibit a higher Tg and toughness that results in superior properties such as heat seal resistance or block resistance in overprint varnish applications. However, the higher viscosity of these compositions may a disadvantage in certain applications where one would want less viscosity or thickening.

The lower viscosity of samples from Examples 8 through 12 show that the method of blending is important to forming a nanocomposite. Higher viscosities are obtained when the clay is added at a low pH ranging from 2 to 6 than when the clay is added to a neutralized composition with a pH of 9 or greater. It is believed that the high pH may prevent or minimize exfoliation whereas the low pH conditions of Examples 5 through 7 promotes exfoliation.

Example 13
Alkali Soluble Resin with High Levels of Clay (25%)

A latex was prepared in accordance with Example 1 except that a 25% clay level was added to the reaction based upon the dry weight of monomers. The amount of DI water within the reaction kettle was increased to produce a 22% solids latex. After cooling, the sample was filtered through a 325 mesh screen to remove any large pieces of coagulated material-no measurable quantity of which was present. The resulting latex had a 21.7% solids content, pH of 4.2 and particle size of 294 nm. When neutralized to with ammonium hydroxide to a pH above 9 and at a solids level of about 21%, a viscous gel resulted. This indicates that the clay within the resultant latex was highly exfoliated. This is unexpected because natural clays, unlike more expensive, synthetic clays such as laponite, do not exfoliate as efficiently in water.

Example 14
Alkali Soluble Resin with High Levels of Clay (60%)

A latex was prepared in accordance with Example 1 except that a 60% clay level was added to the reaction based upon the dry weight of monomers. The amount of DI water within the reaction kettle was increased to produce a 12% solids latex. After cooling, the sample was filtered through a 325 mesh screen to remove any large pieces of coagulated material of which no measurable quantity was present. The resulting latex had a 11.8% solids content, pH of 4.1 and particle size of 292 nm. When neutralized with ammonium hydroxide to a pH of 9 or greater and at a solids level of about 10%, a gel resulted. This indicates that the clay within the resultant latex was highly exfoliated. This is unexpected because natural clays, unlike more expensive, synthetic clays such as laponite, do not exfoliate as efficiently in water.

Example 15
HASE Polymers with Unmodified Clay in situ

A series of exemplary HASE (hydrophobically modified alkali swellable emulsion) polymers are prepared by the emulsion polymerization process described in U.S. Pat. No. 4,421,902 and with increasing levels, 0%, 5, 10%, 15% and 20% of an unmodified sodium montmorillonite PGV clay. The clay is added in the initial kettle charge. The composition of the resultant polymer within the polymer clay nanocomposite is 50 ethyl acrylate ("EA")/40 MAA/10 lauryl poly(oxyethylene) acrylate, where the poly(oxyethylene) acrylate contains an average of 23 ethylene oxide units. A quantity of 0.001 mole of an alkyl mercaptan is included with the monomers prior to polymerization to control molecular weight. Additional water is added to the kettle charge for polymers containing higher clay levels to insure the product has a viscosity that can be stirred and poured. At 1% solids in water and neutralized to a pH of 9.5 with ammonia hydroxide, each exemplary composition showed increasing viscosity with increasing clay level. Further, the polymer clay nanocomposite dispersions exhibit a rheology with a yield point which is desirable for certain applications such as thickening liquid laundry detergent.

Example 16
HASE Polymers with Unmodified Clay Admixed

A series of blends of exemplary HASE of the same chemical composition of Example 15 with increasing levels, 0%, 5, 10%, 15% and 20% of an unmodified sodium montmorillonite PGV clay, are prepared in accordance with the method described in Examples 5 through 7. At 1% solids in water and neutralized to pH of 9.5 with ammonia hydroxide, each sample shows increasing viscosity with increasing clay level. Also, the clay containing polymers exhibit rheology with a yield point, desirable for applications such as thickening liquid laundry detergent. When compared with the analogous samplea in Example 15, the samples of Example 16 will exhibit lower viscosity. The greater thickening efficiency that results from the in situ technique makes it the preferred route to such polymer/clay nanocomposites.

Example 17
ASE Polymers with Unmodified Clay in situ

A series of exemplary ASE (alkali swellable emulsion) polymers are prepared by the emulsion polymerization process described in U.S. Pat. No. 4,421,902 and with increasing levels, 0%, 5, 10%, 15% and 20% of an unmodified sodium montmorillonite PGV clay. The clay is added in the initial kettle charge. The composition of the resultant polymer within the polymer clay nanocomposite is 60 EA/40

MAA. The clay is included in the initial kettle charge (similar results can be obtained if it in introduced into the water in the monomer emulsion, but the resulting viscosity makes the monomer emulsion difficult to handle). Additional water is added to the kettle charge for polymers containing higher clay levels to insure the product has a viscosity that can be stirred and poured. At 1% solids in water and neutralized to pH 9.5 with ammonia hydroxide, each exemplary composition shows increasing viscosity with increasing clay level. Further, the polymer clay nanocomposite dispersions exhibit a rheology with a yield point which is desirable for certain applications such as thickening liquid laundry detergent.

Example 18
ASE Polymers with Unmodified Clay Admixed

A series of blends of exemplary ASE polymers of the same chemical composition of Example 17 with increasing levels, 0%, 5, 10%, 15% and 20% of an unmodified PGV clay provided by Nanocor of Arlington Heights, Ill., are prepared in accordance with the method described in Examples 5 through 7. At 1% solids in water and neutralized to pH 9.5 with ammonia hydroxide, each sample shows increasing viscosity with increasing clay level. Also, the clay containing polymers exhibit rheology with a yield point, desirable for applications such as thickening liquid laundry detergent. When compared with the analogous sample in example 17, the samples of example 18 will have lower viscosity. The greater thickening efficiency that results from the in situ technique makes it the preferred route to such polymer/clay nanocomposites.

Example 19
Use of a High Acid Seed to Deliver Clay to an Emulsion Polymer

A latex is synthesized via the following method: An empty reactor kettle was charged while stirring a quantity of 167 g DI water and a 100 g quantity of the emulsion polymer from example 13. In a separate vessel, a monomer emulsion is formed containing 55.0 g water, 1.1 g anionic surfactant (100 % solids), 132 g butyl acrylate, 84.7 g methyl methacrylate and 3.3 g methacrylic acid. The reactor contents are heated to 85° C. and 1.1 g ammonium persulfate dissolved in 50 g of DI water added. The monomer emulsion is fed into the kettle such that a reactor temperature of 85° C. is maintained. After monomer feeds were completed, the batch is cooled to 65° C. Upon reaching 65° C., 1.9 g ferrous sulfate (0.15% aqueous) is added to the reactor. Then, a 0.19 g quantity of 70% tert-butyl hydroperoxide in 5.5 g of water was added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water is added. After cooling, the sample is filtered to remove any large pieces of coagulated material. The resulting latex will have a solids content of about 42% and particle size of about 600 nm. Films from this latex will exhibit higher tensile strength, less permeability, greater fire retardancy and less surface tack than material without clay. The ability of the latex to form a film is not inhibited by the clay.

Example 20
Use of an Alkali Soluble Resin/Clay Nanocomposite to Prepare a Core Shell Polymer A latex is synthesized via the following method: To an empty reactor kettle is added with stirring a 500 g quantity of the emulsion polymer from example 1. A monomer emulsion is formed containing 30.0 g water, 0.5 g anionic surfactant (100% solids), 71.5 g butyl acrylate and 38.5 g methyl methacrylate. The reactor contents are heated to 85° C. and 0.5 g ammonium persulfate dissolved in 50 g of DI water added. The monomer emulsion is fed into the kettle such that a reactor temperature of 85° C. is maintained. After monomer feeds are completed, the batch is cooled to 65° C., and upon reaching 65° C. 1.9 g ferrous sulfate (0.15% aqueous) is added to the reactor. Then, a 0.19 g quantity of 70% tert-butyl hydroperoxide in 5.5 g of water is added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water is added. After cooling, the sample is filtered to remove any large pieces of coagulated material. The resulting latex will have a solids content of about 31% and particle size of about 196 nm. Because of the greater hydrophilicity of the alkali soluble resin it will reside at the surface of the particle, forming a core/shell particle. On neutralization this type of polymer is useful in applications such a clear overprint varnishes. Films from this latex will exhibit higher tensile strength, less permeability, greater fire retardancy and greater heat seal resistance (block resistance) than material without clay. The ability of the latex to form a film is not inhibited by the clay.

Example 21
Use of a High Acid Seed to Deliver Clay to an Emulsion Polymer including Hydrophobic Modification A latex is synthesized via the following method: An empty reactor kettle is charged with while stirring a quantity of 167 g DI water and a 100 g quantity of the emulsion polymer from example 13. Next, a quantity of 1.96 g tetra butylammonium acetate dissolved in 42 g of deionized water is added to the reactor with stirring. In a separate vessel, a monomer emulsion is formed containing 55.0 g water, 1.1 g anionic surfactant (100% solids), 132 g butyl acrylate, 84.7 g methyl methacrylate and 3.3 g methacrylic acid. The reactor contents are heated to 85° C. and 1.1 g ammonium persulfate dissolved in 50 g of DI water is added. The monomer emulsion is gradually added into the kettle such that a reactor temperature of 85° C. is maintained. After monomer feeds are completed, the batch is cooled to 65° C. Upon reaching 65° C., 1.9 g ferrous sulfate (0.15% aqueous) is added to the reactor. Then, a 0.19 g quantity of 70% tert-butyl hydroperoxide in 5.5 g of water is added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water was added. After cooling, the sample is filtered to remove any large pieces of coagulated material. The resulting latex will have a solids content of about 42% and particle size of about 600 nm. Films from this latex will exhibit higher tensile strength, less permeability, greater fire retardancy and less surface tack than material without clay. Films may exhibit less water sensitivity than those utilizing clay that has not been hydrophobically modified. The ability of the latex to form a film is not inhibited by the clay.

Example 22
Use of a High Acid Seed to Deliver Clay to an Emulsion Polymer including Hydrophobic Modification A latex is synthesized via the following method: To an empty reactor kettle is added with stirring 167 g DI water and a 100 g quantity of the emulsion polymer from example 13. Next, a quantity of 5.4 g of a 20% aqueous benzyl trimethyl ammonium hydroxide solution is added to the reactor with good stirring. In a separate vessel, a monomer emulsion is formed containing 55.0 g water, 1.1 g anionic surfactant (100% solids), 132 g butyl acrylate, 84.7 g methyl methacrylate and 3.3 g methacrylic acid. The reactor contents are heated to 85° C. and 1.1 g ammonium persulfate dissolved in 50 g of DI water is added. The monomer emulsion is gradually added into the kettle such that a reactor temperature of 85° C. was maintained. After monomer feeds are completed, the batch was cooled to 65° C. Upon reaching 65° C., 1.9 g ferrous sulfate (0.15% aqueous) is added to the reactor. Then, a 0.19 g quantity of 70% tert-butyl hydroperoxide in 5.5 g of water is added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water was added. After cooling, the sample is filtered to remove any large pieces of coagulated material. The resulting latex will have a solids content of about 42% and particle size of about 600 nm. Films from this latex will exhibit higher tensile strength, less permeability, greater fire retardancy and less surface tack than material without clay. Films may exhibit less water sensitivity than those utilizing clay that has not been hydrophobically modified. The ability of the latex to form a film is not inhibited by the clay.

Example 23
Use of a High Acid Seed to Deliver Clay to an Emulsion Polymer including Hydrophobic Modification A latex is synthesized via the following method: To an empty reactor kettle is added with stirring 167 g DI water and a 100 g quantity of the emulsion polymer from example 13. Next, a mixture of surfactant having 0.86 g 75% active dimethyl di(hydrogenated tallow) ammonium chloride, 0.21 g 77% active dimethyl benzyl (hydrogenated tallow) ammonium chloride and 20 g Triton X-405 (70% nonionic surfactant, Union Carbide) is added to the reactor with good stirring. A monomer emulsion was formed containing 55.0 g water, 1.1 g anionic surfactant (100% solids), 132 g butyl acrylate, 84.7 g methyl methacrylate and 3.3 g methacrylic acid. The reactor contents were heated to 85° C. and 1.1 g ammonium persulfate dissolved in 50 g of DI water added. The monomer emulsion was fed into the kettle such that a reactor temperature of 85° C. was maintained. After monomer feeds were completed, the batch was cooled to 65° C., and upon reaching 65° C. 1.9 g ferrous sulfate (0.15% aqueous) was added to the reactor. Then, a 0.19 g quantity of 70% tert-butyl hydroperoxide in 5.5 g of water was added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water was added. After cooling the sample was filtered to remove any large pieces of coagulated material. The resulting latex will have a solids content of about 42% and particle size of about 600 nm. Films from this latex will exhibit higher tensile strength, less permeability, greater fire retardancy and less surface tack than material without clay. Films may exhibit less water sensitivity than those utilizing clay that has not been hydrophobically modified. The ability of the latex to form a film is not inhibited by the clay.

Example 24
Use of a High Acid Seed to Deliver Clay to an Emulsion Polymer including Hydrophobic Modification A latex is synthesized via the following method: To an empty reactor kettle is added with stirring 167 g DI water and a 100 g quantity of the emulsion polymer from example 13. Next, a mixture of surfactant having 0.86 g 75% active dimethyl di(hydrogenated tallow) ammonium chloride, 0.21 g 77% active dimethyl benzyl (hydrogenated tallow) ammonium chloride, 10 g DI water and 10 g beta-cyclodextrin is added to the reactor with good stirring. In a separate vessel, a monomer emulsion is formed containing 55.0 g water, 1.1 g anionic surfactant (100% solids), 132 g butyl acrylate, 84.7 g methyl methacrylate and 3.3 g methacrylic acid. The reactor contents were heated to 85° C. and 1.1 g ammonium persulfate dissolved in 50 g of DI water is added. The monomer emulsion is gradually added into the kettle such that a reactor temperature of 85° C. was maintained. After monomer feeds are completed, the batch is cooled to 65° C. Upon reaching 65° C., 1.9 g ferrous sulfate (0.15% aqueous) is added to the reactor. Then, a 0.19 g quantity of 70% tert-butyl hydroperoxide in 5.5 g of water is added along with a 0.09 g quantity of sodium sulfoxylate formaldehyde in 3.75 g water and held at 60° C. for 20 minutes. After this, a 0.75 g quantity of 70% tert-butyl hydroperoxide in 5.5 g of water is added. After cooling, the sample is filtered to remove any large pieces of coagulated material. The resulting latex will have a solids content of about 42% and particle size of about 600 nm. Films from this latex will exhibit higher tensile strength, less permeability, greater fire retardancy and less surface tack than material without clay. Films may exhibit less water sensitivity than those utilizing clay that has not been hydrophobically modified. The ability of the latex to form a film is not inhibited by the clay.

Example 25
Opaque Polymer and other Core Shell Examples

Using the procedures in, for example, U.S. Pat. Nos. 6,252,004, 5,545,695, and 4,468,498, a series of high acid, core shell polymers is prepared with varying amounts of clay ranging from 5–90% (based on core monomer weight) sodium montmorillonite (PGV Clay, Nanocor, Arlington Heights, Ill.). Using the techniques and reagents from examples 21 to 23, the clay is hydrophobically modified before the addition of shell stage(s). When the cores are swollen with a basic swelling agent and encapsulated in a hard shell, the resulting voided polymers had harder shells that resulted in improved preservation of the void in films as well as in adverse environments, such as but not limited to, polymer melts for fiber spinning. When the shells are sufficient hardness to form a film at or near room temperature, films from this latex will exhibit higher tensile strength, less permeability, greater fire retardency and less surface tack than comparable films without clay. Further, these films may exhibit less water sensitivity than those utilizing clay that has not been hydrophobically modified. Moreover, the ability of the latex to form a film is not inhibited by the clay.

We claim:

1. A process for preparing an aqueous polymer clay nanocomposite dispersion comprising the steps of:
   providing an aqueous dispersion comprising at least one clay, optionally at least one ethylenically unsaturated monomer, and optionally at least one surfactant;
   providing a monomer mixture comprising at least 10 weight percent of an acid containing monomer within the monomer mixture and optionally at least one surfactant;
   mixing the aqueous dispersion and the monomer mixture; and
   polymerizing at least a portion of the monomer to form the nanocomposite dispersion wherein the clay is at least partially exfoliated within the nanocomposite dispersion.

2. A process for preparing an aqueous polymer clay nanocomposite dispersion comprising the steps of:
   providing an aqueous dispersion comprising at least one clay, optionally at least one ethylenically unsaturated monomer, and optionally at least one surfactant;

providing a monomer mixture comprising at least 10 weight percent of an acid containing monomer within the monomer mixture, at least one clay, and optionally at least one surfactant;

mixing the aqueous dispersion and the monomer mixture; and polymerizing at least a portion of the monomer to form the nanocomposite dispersion wherein the clay is at least partially exfoliated within the nanocomposite dispersion.

3. A process for preparing an aqueous polymer clay nanocomposite dispersion comprising the steps of:

providing an aqueous dispersion comprising at least one clay, at least one ethylenically unsaturated monomer, at least 10 weight percent of an acid containing monomer within the monomer mixture and optionally at least one surfactant;

providing a monomer mixture comprising at least one ethylenically unsaturated monomer, and optionally at least one surfactant;

mixing the aqueous dispersion and the monomer mixture; and polymerizing at least a portion of the monomer to form the nanocomposite dispersion wherein the clay is at least partially exfoliated within the nanocomposite dispersion.

4. The process according to claim 1, 2, or 3 further comprising the step of neutralizing the aqueous polymer clay nanocomposite dispersion wherein the neutralizing step is performed after the polymerizing step.

5. The process according to claim 1, 2, or 3 wherein the at least one ethylenically unsaturated monomer is selected from the group consisting of $C_1$–$C_{18}$ alkyl (meth)acrylate, 2-ethylhexyl (meth)acrylate, isobornyl (meth)acrylate, lauryl (meth)acrylate, stearyl (meth)acrylate, acrylonitrile, methacrylonitrile, ethylene, butadiene, vinyl acetate, vinyl versatate, styrene, vinyl aromatic monomers, hydroxyethyl (meth)acrylate, hydroxypropyl(meth)acrylate, and combinations thereof.

6. The process according to claim 1, 2, or 3 wherein the acid containing monomer is selected from the group consisting of methacrylic anhydride, maleic anhydride, itaconic anhydride, acrylic acid, methacrylic acid, itaconic acid, maleic acid, fumaric acid, acryloxypropionic acid, (meth) acryloxypropionic acid, styrene sulfonic acid, ethylmethacrylate-2-sulphonic acid, 2-acrylamido-2-methylpropane sulphonic acid; phosphoethylmethacrylate; the corresponding salts of the acid containing monomer, and combinations thereof.

7. The process according to claim 1, 2, or 3 wherein the monomer mixture comprises at least 20 weight percent of the acid containing monomer within the monomer mixture.

8. The process according to claim 7 wherein the monomer mixture comprises at least 40 weight percent of the acid containing monomer within the monomer mixture.

9. The process according to claim 1, 2, or 3 wherein the monomer mixture further comprises at least one polyunsaturated monomer.

10. The process according to claim 1, 2, or 3 wherein the at least one polyunsaturated monomer is selected from the group consisting of divinylbenzene, divinylpyridine, divinyltoluene, diallyl phthalate, ethylene glycol di(meth) acrylate, butylene glycol di(meth)acrylate, divinylxylene, divinylethylbenzene, divinylsulfone, divinylketone, divinylsulfide, allyl (meth)acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof.

11. The process according to claim 1, 2, or 3 wherein the monomer mixture further comprises at least one associative monomer.

12. The process according to claim 1, 2, or 3 wherein the at least one clay is selected from the group consisting of smectite, phyllosilicate, montmorillonite, saponite, beidellite, montronite, hectorite, stevensite, vermiculite, kaolinite, hallosite, synthetic phyllosilicates, and combinations thereof.

13. The process according to claim 1, 2, or 3 wherein the monomer mixture further comprises a chain transfer agent.

14. An aqueous nanocomposite dispersion prepared according to the process of claim 1, 2, or 3.

15. A thickener comprising the aqueous nanocomposite dispersion of claim 14.

16. A dispersant comprising the aqueous nanocomposite dispersion of claim 14.

17. A binder comprising the aqueous nanocomposite dispersion of claim 14.

18. A flexographic ink composition comprising the aqueous nanocomposite dispersion of claim 14.

19. An over print varnish comprising the aqueous nanocomposite dispersion of claim 14.

20. A dry cement powder modifier comprising the dried powder form of the aqueous nanocomposite dispersion of claim 14.

21. A process for preparing an aqueous polymer clay nanocomposite dispersion, the process comprising the steps of:

providing an aqueous emulsion comprising a polymer clay nanocomposite seed dispersion formed by the process according to claim 1, 2, or 3 wherein the polymer clay nanocomposite comprises 0.1 to 200 weight percent of an unmodified clay based on dry weight of total dry polymer weight in the nanocomposite dispersion;

providing a monomer emulsion comprising at least one ethylenically unsaturated monomer, optionally at least one polyunsaturated monomer, and optionally at least one surfactant;

adding the monomer emulsion to the aqueous emulsion; and polymerizing the monomer to form the aqueous polymer clay nanocomposite dispersion.

22. The process of claim 21 wherein the polymer clay nanocomposite seed is hydrophobically modified by a modifying agent.

23. The process of claim 24 wherein at least one of the aqueous emulsion or monomer emulsion further comprises 0.1 to 20% based on dry weight of total dry polymer weight in said aqueous polymer clay nanocomposite dispersion of at least one unmodified clay.

24. An aqueous polymer clay nanocomposite dispersion, wherein the dispersion comprises:

a polymer latex comprising at least 10% polymerized units of at least one acid containing monomer; and a clay dispersion comprising at least one clay that is at least partially exfoliated during the polymerization of the latex;

wherein the viscosity of the nanocomposite dispersion after neutralization is higher than a nanocomposite dispersion in which the polymer latex and the clay dispersion are admixed.

25. The aqueous polymer clay nanocomposite dispersion according to claim 24 wherein the haziness of the nanocomposite dispersion after neutralization is less hazy than a nanocomposite dispersion in which the polymer latex and the clay dispersion are admixed.

26. A polymer clay nanocomposite composition, the nanocomposite composition comprising:
   a polymer core polymerized from an aqueous dispersion comprising at least one clay, an ethylenically unsaturated monomer, and optionally at least one surfactant; and
   a polymer shell that is associated with said core and polymerized from a monomer mixture comprising at least 10 weight percent of an acid containing monomer within the monomer mixture, optionally at least one clay, and optionally a surfactant, wherein the ratio of the polymer core to the polymer shell is 90:10 to 10:90.

27. A polymer clay nanocomposite composition, the nanocomposite composition comprising:
   a polymer core polymerized from a monomer mixture comprising at least 10 weight percent of an acid containing monomer within the monomer mixture, optionally at least one clay, and optionally at least one surfactant; and
   a polymer shell that is associated with said core and polymerized from an aqueous dispersion comprising at least one clay, at least one ethylenically unsaturated monomer, and optionally at least one surfactant, wherein the ratio of the polymer core to the polymer shell is 90:10 to 10:90.

28. A polymer clay nanocomposite composition, the nanocomposite composition comprising:
   a polymer core polymerized from an aqueous dispersion comprising at least one clay, at least 10 weight percent of an acid containing monomer within the aqueous dispersion, and optionally at least one surfactant; and
   a polymer shell that is associated with said core and polymerized from a monomer mixture comprising optionally at least one clay, at least one ethylenically unsaturated monomer, and optionally at least one surfactant, wherein the ratio of the polymer core to the polymer shell is 90:10 to 10:90.

29. A polymer clay nanocomposite composition, the nanocomposite composition comprising:
   a polymer core polymerized from a monomer mixture comprising at least one ethylenically unsaturated monomer, optionally at least one clay, and optionally at least one surfactant; and
   a polymer shell that is associated with said core and polymerized from an aqueous dispersion comprising at least 10 weight percent of an acid containing monomer within the aqueous dispersion, at least one clay, an ethylenically unsaturated monomer, and optionally at least one surfactant, wherein the ratio of the polymer core to the polymer shell is 90:10 to 10:90.

30. The polymer clay nanocomposite composition according to claim 26, 27, 28, or 29 wherein at least one of the monomer mixture or the aqueous dispersion further comprises at least one polyunsaturated monomer.

31. The polymer clay nanocomposite composition according to claim 30 wherein the at least one polyunsaturated monomer is selected from the group consisting of allyl, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-diallyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-alkyl-, aryl-, P-vinyl, P-allyl, P-crotyl-, and P-methallyl-phosphonates triallyl-, trimethallyl-, and tricrotyl-phosphates; O,O-diallyl-, dimethallyl-, and dicrotyl-phosphates; cycloalkenyl esters of acrylic, methacrylic maleic (mono- and di-esters), fumaric (mono- and di-esters), and itaconic (mono- and di-esters) acids; vinyl ethers and thioethers cycloalkenols and cycloalkene thiols; vinyl esters of cycloalkene carboxylic acids; 1,3-butadiene, isoprene, and other conjugated dienes; paramethylstyrene; chloromethylstyrene; allyl-, methallyl-, vinyl-, and crotyl-mercaptan; bromotrichloromethane; bromoform carbon tetrachloride; and carbon tetrabromide and combinations thereof.

32. The polymer clay nanocomposite composition according to claim 26, 27, 28, or 29 wherein the at least one ethylenically unsaturated monomer is selected from the group consisting of $C_1$–$C_{18}$ alkyl (meth)acrylate, 2-ethylhexyl (meth)acrylate, isobornyl (meth)acrylate, lauryl (meth)acrylate, acrylonitrile, methacrylonitrile, stearyl (meth)acrylate, ethylene, butadiene, vinyl acetate, vinyl versatate, styrene, vinyl aromatic monomers, hydroxyethyl (meth)acrylate, hydroxypropyl(meth)acrylate, and combinations thereof.

33. The polymer clay nanocomposite composition according to claim 26, 27, 28, or 29 wherein the Tg of the polymer core is 30° C. or greater.

34. The polymer clay nanocomposite composition according to claim 26, 27, 28, or 29 wherein the Tg of the polymer core is below 30° C.

35. The polymer clay nanocomposite composition according to claim 26, 27, 28, or 29 wherein the Tg of the polymer shell is 30° C. or greater.

36. The polymer clay nanocomposite composition according to claim 26, 27, 28, or 29 wherein the Tg of the polymer shell is below 30° C.

37. The polymer clay nanocomposite composition according to claim 26, 27, 28, or 29 wherein the acid containing monomer is selected from the group consisting of methacrylic anhydride, maleic anhydride, itaconic anhydride, acrylic acid, methacrylic acid, itaconic acid, maleic acid, fumaric acid, acryloxypropionic acid, (meth)acryloxypropionic acid, styrene sulfonic acid, ethylmethacrylate-2-sulphonic acid, 2-acrylamido-2-methylpropane sulphonic acid; phosphoethylmethacrylate; the corresponding salts of the acid containing monomer, and combinations thereof.

38. A polymer clay nanocomposite composition prepared according to the process of claim 26, 27, 28, or 29.

39. A binder comprising the polymer clay nanocomposite composition of claim 38.

40. A flexographic ink composition comprising the polymer clay nanocomposite composition of claim 38.

41. An over print varnish comprising the polymer clay nanocomposite composition of claim 38.

42. A dry cement powder modifier comprising the dried powder form of the polymer clay nanocomposite composition of claim 38.

43. A method for preparing a plurality of hollow, polymer clay nanocomposite particles, wherein the method comprises:

providing an aqueous emulsion of a multi-stage emulsion polymer comprising:
(a) a core stage polymer comprising an aqueous polymer clay nanocomposite composition comprised of polymerized units of at least 10 weight percent of an acid containing monomer, at least one unmodified clay, at least one ethylenically unsaturated monomer, and at least one modifying agent wherein the clay is hydrophobically modified prior to the formation of the shell stage polymer; and
(b) a shell stage polymer comprising polymerized units of at least one ethylenically unsaturated monomer and optionally at least one clay;

swelling the core stage polymer with at least one swelling agent and at least one ethylenically unsaturated monomer such that at least a portion of the core stage polymer contacts at least a portion of the shell stage polymer;

polymerizing the monomer to form the polymer clay nanocomposite particles which become hollow upon drying.

44. A process for preparing an aqueous polymer clay nanocomposite dispersion, comprising:

admixing an aqueous emulsion polymer comprising polymerized units of at least one ethylenically unsaturated monomer wherein at least 10 weight percent or greater of the monomer is an acid containing monomer and optionally at least one polyunsaturated monomer with an aqueous dispersion comprising at least one clay; and
neutralizing said acid.

45. The process according to 44 wherein the admixing step occurs prior to the neutralization of the aqueous emulsion polymer.

46. The process according to claim 44 wherein the aqueous dispersion is heated to a temperature of at least 65° C.

* * * * *